United States Patent
Ohtsu

(10) Patent No.: US 8,508,836 B2
(45) Date of Patent: Aug. 13, 2013

(54) IMAGE PICKUP OPTICAL SYSTEM AND IMAGE PICKUP APPARATUS USING THE SAME

(75) Inventor: Takuya Ohtsu, Funabashi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/473,045

(22) Filed: May 16, 2012

(65) Prior Publication Data

US 2012/0224091 A1 Sep. 6, 2012

Related U.S. Application Data

(62) Division of application No. 12/660,127, filed on Feb. 18, 2010, now Pat. No. 8,203,796.

(30) Foreign Application Priority Data

Feb. 25, 2009 (JP) ................................. 2009-042011

(51) Int. Cl.
*G02B 26/00* (2006.01)
*G09G 3/34* (2006.01)

(52) U.S. Cl.
USPC .......................................... 359/296; 345/107

(58) Field of Classification Search
USPC .................. 348/335, 340; 359/714, 763, 764
See application file for complete search history.

(56) References Cited

U.S. PATENT DOCUMENTS

| | | | |
|---|---|---|---|
| 8,179,615 B1* | 5/2012 | Tang et al. | ..................... 359/714 |
| 2011/0013069 A1 | 1/2011 | Chen | |
| 2011/0304928 A1 | 12/2011 | Abe | |
| 2011/0310287 A1 | 12/2011 | Ohtsu | |
| 2012/0026388 A1 | 2/2012 | Sano et al. | |
| 2012/0162784 A1* | 6/2012 | Tang et al. | ..................... 359/714 |

FOREIGN PATENT DOCUMENTS

| | | |
|---|---|---|
| JP | 01-235920 | 9/1989 |
| JP | 02-167516 | 6/1990 |
| JP | 10-123418 | 5/1998 |
| JP | 2000-019387 | 1/2000 |
| JP | 2005-148615 | 6/2005 |
| JP | 2007-264180 | 10/2007 |
| JP | 2007-279282 | 10/2007 |
| JP | 2007-298572 | 11/2007 |
| WO | 2010/024198 | 3/2010 |

* cited by examiner

*Primary Examiner* — David N Spector
(74) *Attorney, Agent, or Firm* — Kenyon & Kenyon LLP

(57) ABSTRACT

An image pickup optical system made of five lenses, includes in order from an object side, an aperture stop, a first lens L1 having a positive refracting power, a second lens L2 having a negative refracting power, a third lens L3 having a positive refracting power, a fourth lens L4 having a positive refracting power, and a fifth lens L5 having a negative refracting power. Moreover, an image pickup apparatus includes this image pickup optical system.

20 Claims, 22 Drawing Sheets

IMAGE PICKUP OPTICAL SYSTEM AND IMAGE PICKUP APPARATUS USING THE SAME

CROSS-REFERENCE TO RELATED APPLICATION

The present application is a divisional of U.S. patent application Ser. No. 12/660,127 filed on Feb. 18, 2010 now U.S. Pat. No. 8,203,796, which is based upon and claims the benefit of priority from the prior Japanese Patent Application No. 2009-042011 filed on Feb. 25, 2009; the entire contents of which are incorporated herein by reference.

BACKGROUND OF THE INVENTION

1. Field of the Invention

The present invention relates to an image pickup optical system and an image pickup apparatus using the same.

2. Description of the Related Art

In recent years, a camera module in which, a thickness in an optical axial direction of an optical system is thinned to the maximum with thinning of a cellular telephone has been sought.

Moreover, with an increase in a size and the number of pixels of an image pickup element in recent years, a lens having a high resolution has been sought. In order to meet this demand, a single focus optical system which includes about three to five aspheric lenses has been proposed in Japanese Patent Application Laid-open Publication Nos. 2007-264180 and 2007-298572.

SUMMARY OF THE INVENTION

According to a first aspect of the present invention, an image pickup optical system according to the present invention, which is consisted of five lenses, includes in order from an object side an aperture stop,
a first lens having a positive refracting power,
a second lens having a negative refracting power,
a third lens having a positive refracting power,
a fourth lens having a positive refracting power, and
a fifth lens having a negative refracting power, in which the image pickup optical system has a fixed focal length, and at least one of surfaces of the fifth lens has an inflection point.

According to a second aspect of the present invention, an image pickup apparatus according to the present invention includes the abovementioned image pickup optical system, and
an electronic image pickup element having an image pickup surface, and the image pickup apparatus satisfies the following conditional expression $$15° < \alpha i < 30° \quad (7)$$

where, $\alpha i$ denotes an angle of incidence of principal light rays on an image pickup surface at the maximum image height.

BRIEF DESCRIPTION OF THE DRAWINGS

FIG. 21A is a front view of a cellular phone 400, FIG. 21B is a side view of the cellular phone 400, and FIG. 21C is a cross-sectional view of a photographic optical system 405.

DETAILED DESCRIPTION OF THE PREFERRED EMBODIMENTS

Figure 1:
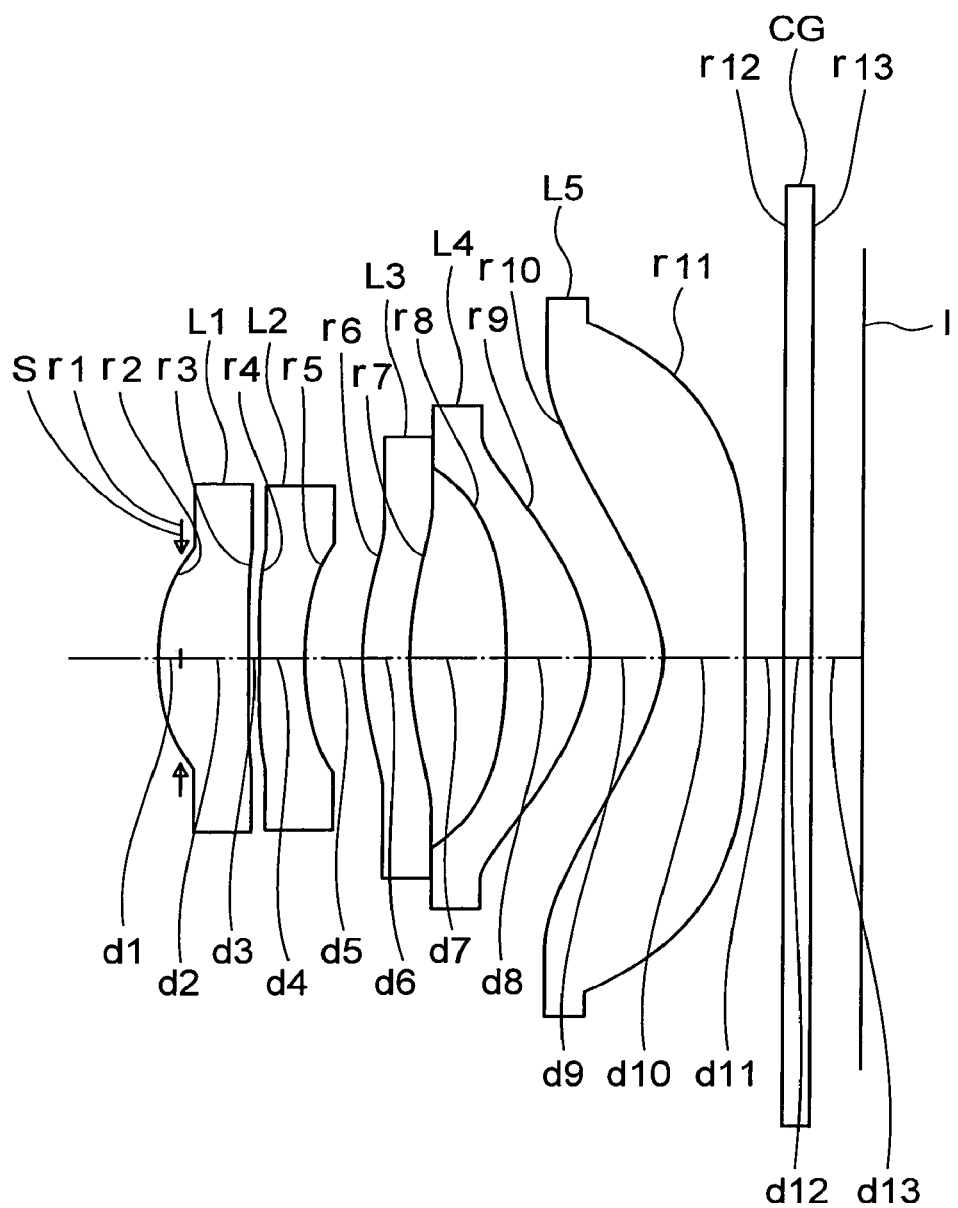
FIG. 1 is a cross-sectional view along an optical axis showing an optical arrangement at a time of infinite object point focusing of an image pickup optical system according to a first embodiment of the present invention.

Prior to describing embodiments, an action and an effect of an image pickup optical system of the embodiment will be described below.

The image pickup optical system which is formed of five lenses, includes in order from an object side
a first lens having a positive refracting power,
a second lens having a negative refracting power,
a third lens having a positive refracting power,
a fourth lens having positive refracting power, and
a fifth lens having a negative refracting power,
in which the image pickup optical system has a fixed focal length, and at least one of surfaces of the fifth lens has an inflection point.

In the image pickup optical system of the embodiment, the aperture is disposed nearest to the object side. Therefore, an exit pupil can be kept away from an image surface. Accordingly, at an image forming position (an image pickup surface of an electronic image pickup element), it is possible to make small an angle of incidence of light rays incident on a peripheral portion. Consequently, it is possible to make short an optical length, and to avoid degradation of a sensitivity of a peripheral portion of the image pickup element.

Moreover, since it is possible to dispose a position of principal points more toward the object side of the optical system, it becomes possible to make small the overall length sufficiently, with respect to a focal length. Accordingly, it is possible to realizing a shortening of the overall length of the optical system.

Moreover, by making a five-lens structure by disposing the third lens having the positive refracting power, and letting the fourth lens to be positive, correction of a chromatic aberration of magnification in the peripheral portion becomes advantageous, as compared to a conventional image pickup optical system having a four-lens structure.

Moreover, it is desirable that the image pickup optical system of the embodiment satisfies the following conditional expression.

$$0.36 < f4/f < 3.88 \quad (1)$$

where,
f4 denotes a focal length of the fourth lens, and
f denotes a focal length of the overall image pickup optical system.

The conditional expression (1) regulates a distribution of the refracting power of the fourth lens and the overall image pickup optical system. By satisfying the conditional expression (1), the shortening of the overall length of the optical system and favorable aberration correction are possible.

When an upper limit value in the conditional expression (1) is surpassed, the refracting power of the fourth lens becomes small. As a result, when the shortening of the overall length of the optical system is implemented, securing of telecentricity becomes difficult, and therefore it is not preferable.

When a lower limit value in the conditional expression (1) is surpassed, since the refracting power of the fourth lens becomes excessively substantial, a longitudinal chromatic aberration increases, and aberration correction becomes difficult.

Instead of the conditional expression (1), the following conditional expression (1') may be satisfied.

$$0.47 < f4/f < 2.91 \quad (1')$$

Instead of the conditional expression (1), the following conditional expression (1'') may be satisfied.

$$0.55 < f4/f < 2.52 \quad (1'')$$

Moreover, it is desirable that the image pickup optical system of the embodiment satisfies the following conditional expression.

$$0.81 < f3/f4 < 3.25 \quad (2)$$

where,
f3 denotes a focal length of the third lens, and
f4 denotes the focal length of the fourth lens.

The conditional expression (2) regulates a distribution of the refracting power of the third lens and the fourth lens. By satisfying the conditional expression (2), it is possible to reduce degradation of a decentration sensitivity caused by shortening of the overall optical system, and to correct a curvature of field favorably.

When an upper limit value in the conditional expression (2) is surpassed, the refracting power of the fourth lens becomes remarkably substantial as compared to the refracting power of the third lens. Therefore, as the decentration sensitivity of the fourth lens becomes high, it is not preferable.

When a lower limit value in the conditional expression (2) is surpassed, the refracting power of the third lens becomes remarkably substantial as compared to the refracting power of the fourth lens. Therefore, as the decentration sensitivity of the third lens becomes high, it is not preferable.

When it is out of a range of the conditional expression (2), as the correction of Petzval's sum, or in other words, the correction of the curvature of field becomes difficult, it is not preferable.

Instead of the conditional expression (2), the following conditional expression (2') may be satisfied.

$$1.07 < f3/f4 < 2.44 \quad (2')$$

Instead of the conditional expression (2), the following conditional expression (2'') may be satisfied.

$$1.24 < f3/f4 < 2.11 \quad (2'')$$

Moreover, it is desirable that the image pickup optical system according to the embodiment satisfies the following conditional expression.

$$0.28 < f1/f < 1.23 \quad (3)$$

where,
f1 denotes a focal length of the first lens, and
f denotes a focal length of the overall image pickup optical system.

The conditional expression (3) regulates a distribution of the refracting power of the first lens and the overall image pickup optical system. By satisfying the conditional expression (3), it is possible to make short the overall length of the optical system, and to carry out favorable aberration correction.

When a lower limit value in the conditional expression (3) is surpassed, the refracting power of the first lens becomes strong. In this case, there is an increase in various aberrations, and the aberration correction becomes difficult. Moreover, as manufacturing sensitivity becomes low, it is not preferable.

When an upper limit value in the conditional expression (3) is surpassed, the refracting power of the first lens becomes weak. In this case, as the shortening of the overall length of the optical system becomes difficult, it is not preferable.

Instead of the conditional expression (3), the following conditional expression (3') may be satisfied.

$$0.51 < f1/f < 0.77 \quad (3')$$

Instead of the conditional expression (3), the following conditional expression (3") may be satisfied.

$$0.52 < f1/f < 0.64 \quad (3")$$

Moreover, in the image pickup optical system of the embodiment, it is desirable that a surface on an image surface side of the second lens is a meniscus shaped surface which is concave toward the image side.

By letting the surface on the image surface side of the second lens to be concave shaped toward the image surface side, and to have a negative refracting power, shortening of the overall length of the optical system becomes possible while making substantial an angle of emergence of light rays and securing telecentricity.

Moreover, in the image pickup optical system of the embodiment, it is desirable that a surface on the object side of the third lens has a concave shape or a convex shape toward the object side. By making the surface on the object side of the third lens concave shaped toward the object side, it is possible to suppress an image-plane variation due to a shift in a position of the lens at the time of manufacturing, and the manufacturing sensitivity becomes low.

Moreover, by making the surface on the object side of the third lens convex shaped toward the object side, it becomes advantageous for correction of the chromatic aberration of magnification.

Moreover, in the image pickup optical system of the embodiment, it is desirable that the following conditional expression is satisfied.

$$0.57 < f3/f < 6.31 \quad (4)$$

where, f3 denotes a focal length of the third lens, and f denotes a focal length of the overall image pickup optical system.

The conditional expression (4) regulates a distribution of the third lens and the overall image pickup optical system. By satisfying the conditional expression (4), favorable aberration correction is possible. More elaborately, in the third lens, by suppressing appropriately a paraxial refracting power, it is possible to suppress an increase in a longitudinal chromatic aberration, and to correct the curvature of field favorably.

When a lower limit value in the conditional expression (4) is surpassed, the refracting power of the third lens becomes strong. In this case, the longitudinal chromatic aberration increases and the aberration correction becomes difficult.

When an upper limit value in the conditional expression (4) is surpassed, the refracting power of the third lens becomes weak. In this case, the overall length of the optical system becomes long.

Instead of the conditional expression (4), the following conditional expression (4') may be satisfied.

$$1.68 < f3/f < 4.73 \quad (4')$$

Instead of the conditional expression (4), the following conditional expression (4") may be satisfied.

$$1.78 < f3/f < 4.06 \quad (4")$$

Moreover, in the image pickup optical system of the embodiment, it is desirable that the fourth lens has a meniscus shape which is concave on the object side and convex on the image side. By making the fourth lens meniscus shaped which is concave on the object side and convex on the image side, it is advantageous for correction of the coma aberration while concentricity is not impaired, or in other words, while maintaining a state in which, a curvature center is near the aperture.

Moreover, it is desirable that the image pickup optical system of the embodiment satisfies the following conditional expression.

$$0 < |(SAG4AS - SAG4AA)/4AR| < 0.147 \quad (5)$$

$$0 < |(SAG4BS - SAG4BA)/4BR| < 0.395 \quad (6)$$

where,

SAG4AS denotes a sag amount at a position which is 60% of an effective diameter, when a surface on the object side of the fourth lens is let to be a spherical surface, SAG4AA denotes a sag amount at a position which is 60% of an effective diameter of the surface on the object side of the fourth lens, SAG4BS denotes a sag amount at a position which is 60% of an effective diameter when a surface on an image pickup surface side of the fourth lens is let to be a spherical surface, SAG4BA denotes a sag amount at a position which is 60% of an effective diameter of the surface on the image pickup surface side of the fourth lens, 4AR denotes a paraxial radius of curvature of the surface on the object side of the fourth lens, and 4BR denotes a paraxial radius of curvature of the surface on the image pickup surface side of the fourth lens.

Figure 22:
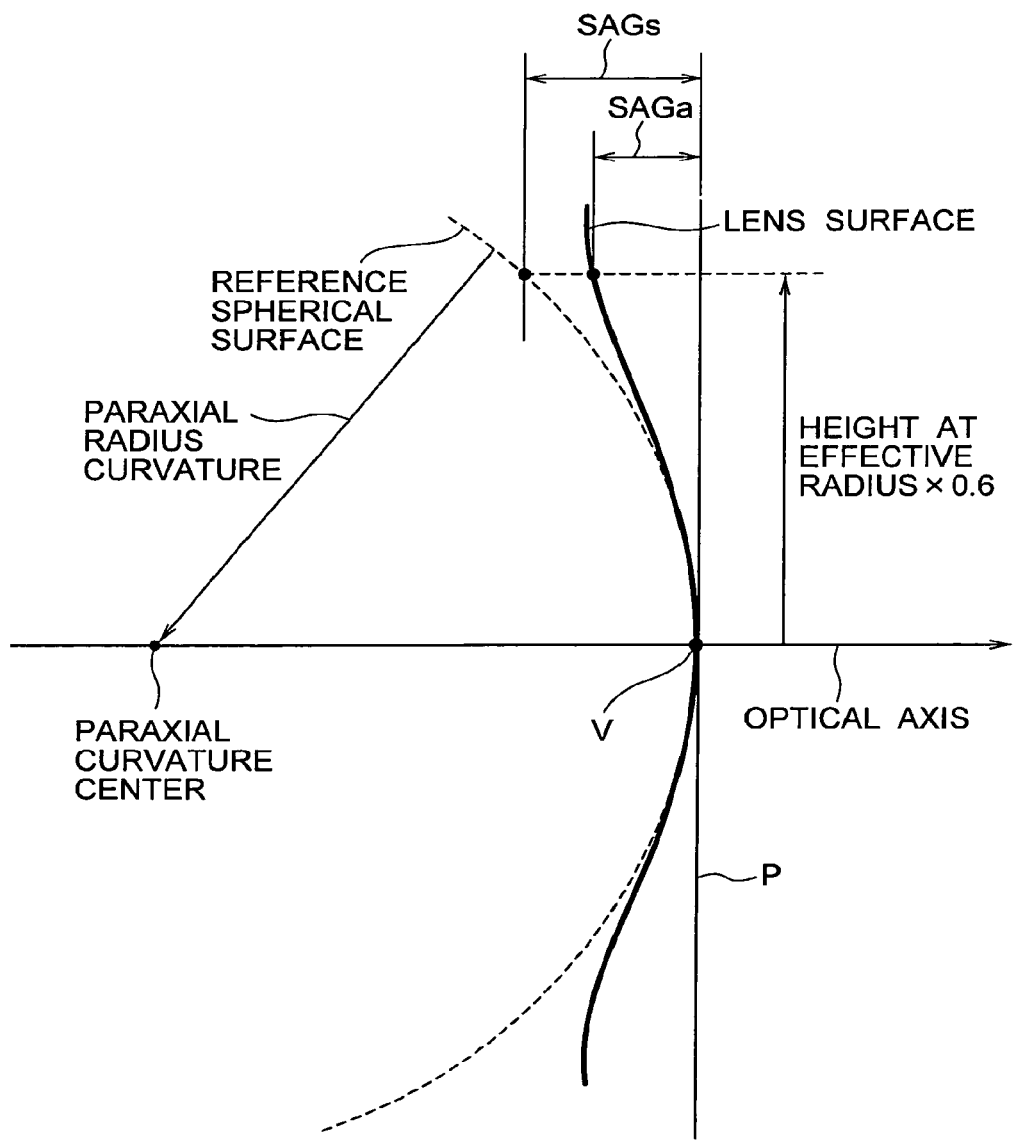
FIG. 22 is a diagram explaining a sag amount.

Here, the sag amount will be described by referring to FIG. 22. 'Sag amount at a position which is 60% of an effective diameter, when a lens surface is let to be a spherical surface' means, a distance P between a reference spherical surface shown by a dotted line and a plane P passing through a plane apex (vertex) V, in a direction along a direction parallel to an optical axis at a position (height) which is 60% of the effective diameter is called as SAG s.

Moreover, 'sag amount at a position which is 60% of an effective diameter of the lens surface' means, a distance P between a lens surface shown by the dotted line and a plane P passing through the plane apex (vertex) V, in a direction along a direction parallel to the optical axis at a position (height) which is 60% of the effective diameter is called as SAG a.

The conditional expressions (5) and (6) regulate conditions preferable for suppressing a variation in the curvature of field due to a variation in an object distance.

When an upper limit value in the conditional expressions (5) and (6) is surpassed, a substantial difference is there in longitudinal and off-axis refracting power, and as the variation in the curvature of field due to the variation in the object distance becomes remarkable, it is not preferable.

Instead of the conditional expressions (5) and (6), the following conditional expressions (5') and (6') may be satisfied.

$$0<|(SAG4AS-SAG4AA)/4AR|<0.091 \quad (5')$$

$$0<|(SAG4BS-SAG4BA)/4BR|<0.197 \quad (6')$$

Instead of the conditional expressions (5) and (6), the following conditional expressions (5") and (6") may be satisfied.

$$0<|(SAG4AS-SAG4AA)/4AR|<0.074 \quad (5")$$

$$0<|(SAG4BS-SAG4BA)/4BR1<0.059 \quad (6")$$

Moreover, in the image pickup optical system of the embodiment, it is desirable that a surface on the object side of the fifth lens is concave shaped toward the object side.

By making the surface on the object side of the fifth lens concave shaped, it is possible to carry out advantageously the correction of the curvature of field and the correction of distortion, while making light rays on an emergence side to be parallel to the optical axis.

Moreover, in the image pickup optical system of the embodiment, it is desirable that the first lens, the second lens, the third lens, the fourth lens, and the fifth lens are formed of resin.

By using a resin as a material for the lenses, it is possible to provide a low-cost image pickup optical system.

Moreover, an image pickup apparatus of the embodiment includes the abovementioned image pickup optical system, and an electronic image pickup element having an image pickup surface, and satisfies the following conditional expression $$15°<\alpha i<30° \quad (7)$$

where, $\alpha i$ denotes an angle of incidence of principal light rays on an image pickup surface at the maximum image height.

In a case of using a CCD (Charge Coupled Device) as the electronic image pickup element, when off-axis light beam emerged from the optical system makes a large (substantial) angle with respect to an image pickup surface, a brightness of image in a central portion and a peripheral portion of the image changes. Moreover, when an angle of incidence at the image pickup surface is small, the problem of the change in the brightness is solved but, the overall length of the optical system becomes long.

When the conditional expression (7) is satisfied, it is possible to suppress non-uniformity of the brightness of the image at the central portion and the peripheral portion of the image, while suppressing the overall length of the optical system from becoming long.

Moreover, in the image pickup apparatus of the embodiment, it is desirable to have a shutter mechanism nearest to the object side of the image pickup optical system.

By disposing the shutter nearest to the object side of the image pickup optical system, it is possible to form the entire optical system and the shutter mechanism separately. Therefore, assembling of an image pickup module becomes easy, and it is advantageous for small sizing of the image pickup module. Moreover, by disposing near the aperture stop, it is possible to reduce an effect of shutter shading.

Moreover, in the image pickup apparatus of the embodiment, it is desirable that the image pickup optical system includes an auto-focus mechanism.

By mounting the auto-focus mechanism, it is possible to focus on an object at any distance.

Moreover, in the image pickup apparatus of the embodiment, it is desirable that the image pickup optical system and the electronic image pickup element are integrated.

By integrating the electronic image pickup element, it is possible to convert an optical image formed by the image pickup optical system into an electric signal. Moreover, by selecting an electronic image pickup element which is capable of reducing the change in the brightness of the image at the central portion and the peripheral portion of the image by (due to) $\alpha i$, it is possible to provide an image pickup apparatus having a small size and an improved performance.

Moreover, in the image pickup optical system of the embodiment, it is desirable that both surfaces of the first lens are aspheric surfaces. This is advantageous for correction of various aberrations. Particularly, this is advantageous for correction of a spherical aberration, a coma aberration, and an astigmatism.

Furthermore, in the image pickup optical system of the embodiment, it is desirable that both surfaces of the second lens are aspheric surfaces. This is advantageous for correction of various aberrations. Particularly, this is advantageous for correction of the spherical aberration, the coma aberration, and the astigmatism.

Moreover, in the image pickup optical system of the embodiment, it is desirable that both surfaces of the fourth lens are aspheric surfaces. This is advantageous for correction of various aberrations. Particularly, this is advantageous for correction of an aberration of a curvature of field, the coma aberration, and the astigmatism.

In the image pickup optical system of the present invention, it is desirable that both surfaces of the fifth lens are aspheric surfaces. This is advantageous for correction of various aberrations. Particularly, this is advantageous for correction of the curvature of field and the astigmatism. Moreover, this is advantageous for securing a so-call telecentricity which is a state in which, light rays on an emergence side are parallel to the optical axis.

Exemplary embodiments of the image pickup optical system and the electronic image pickup apparatus of the embodiment will be described below in detail by referring to the accompanying diagrams. However, the present invention is not restricted to the embodiments described below.

Next, an image pickup optical system according to a first embodiment will be described below. FIG. 1 is a cross-sectional view along an optical axis showing an optical arrangement at a time of infinite object point focusing of an image pickup optical system according to a first embodiment.

Figure 2:
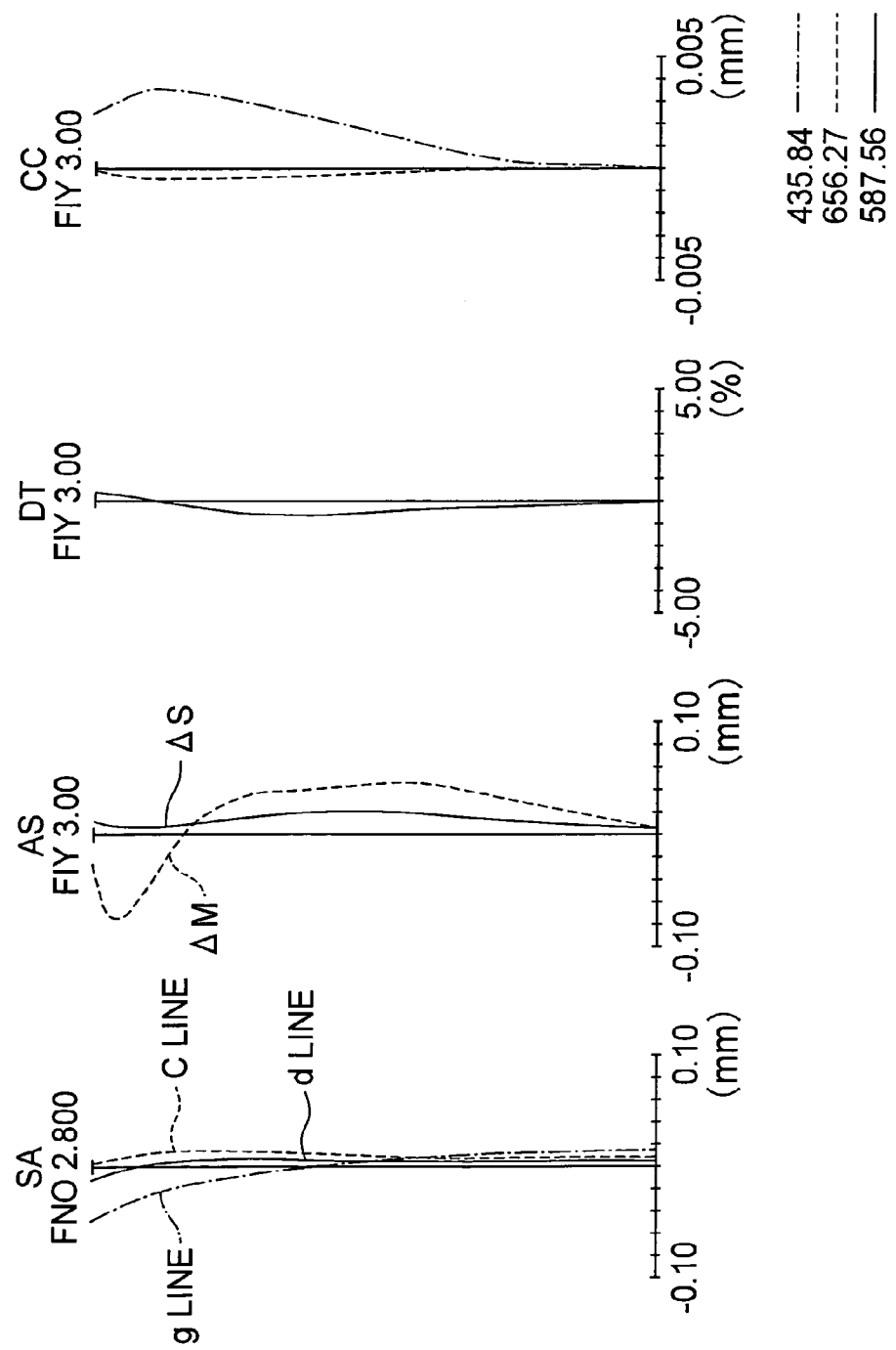
FIG. 2 is a diagram showing a spherical aberration (SA), an astigmatism (AS), a distortion (DT), and a chromatic aberration of magnification (CC) at the time of infinite object point focusing of the image pickup optical system according to the first embodiment.

FIG. 2 is a diagram showing a spherical aberration (SA), an astigmatism (AS), a distortion (DT), and a chromatic aberration of magnification (CC) at the time of infinite object point focusing of the image pickup optical system according to the first embodiment. Moreover, FIY denotes an image height. Reference numerals in aberration diagrams are same in the embodiments which will be described later.

The image pickup optical system according to the first embodiment, as shown in FIG. 1, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power. In all the following embodiments, in lens cross-sectional views, CG denotes a cover glass, and I denotes an image pickup surface of the electronic image pickup element.

The first lens L1 is a biconvex positive lens. The second lens L2 is a biconcave negative lens. The third lens L3 is a positive meniscus lens having a convex surface directed toward the object side. The fourth lens L4 is a positive meniscus lens having a convex surface directed toward the image side. The fifth lens L5 is a biconcave negative lens.

An aspheric surface is provided to both surfaces of all the five lenses L1 to L5.

Figure 3:
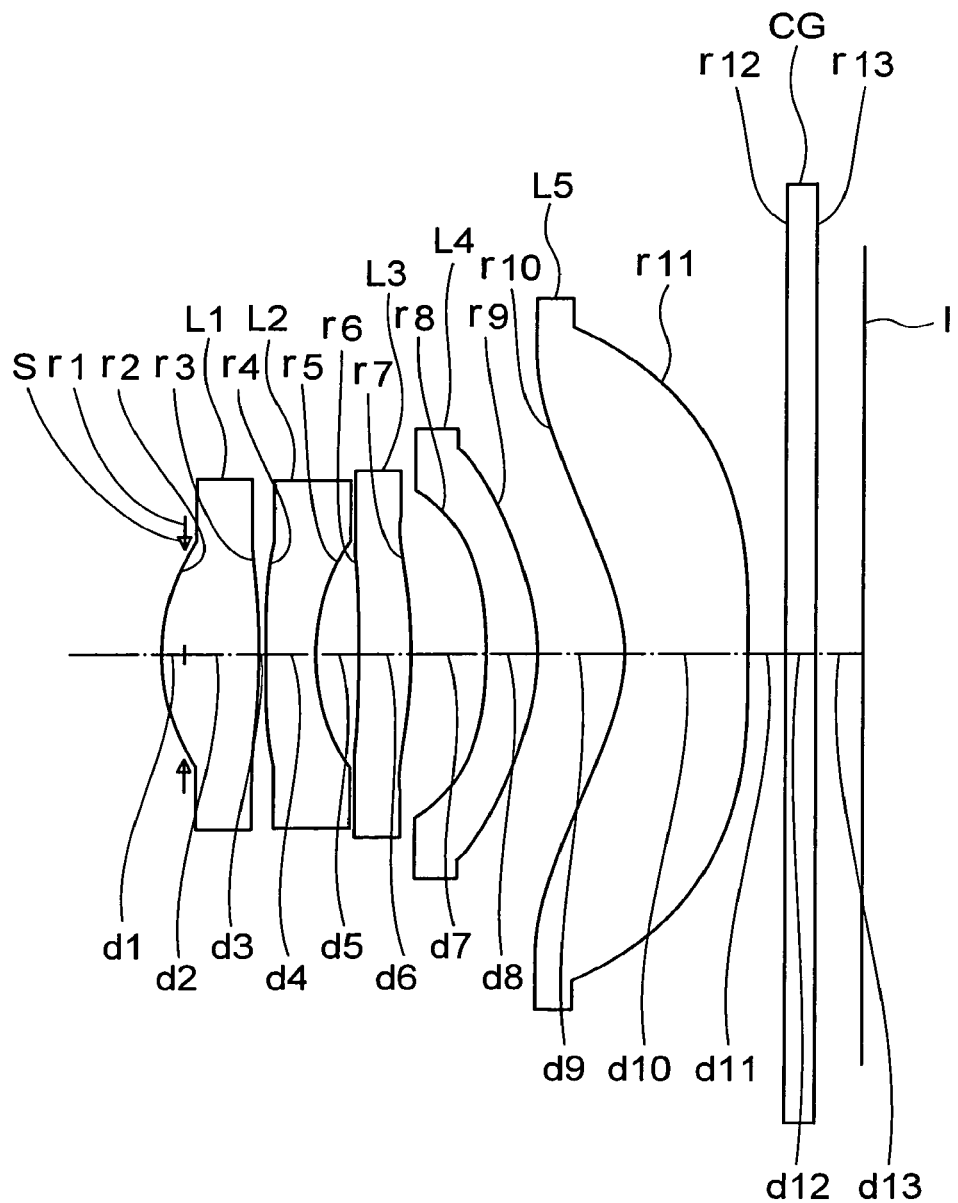
FIG. 3 is a cross-sectional view along an optical axis showing an optical arrangement at a time of infinite object point focusing of an image pickup optical system according to a second embodiment of the present invention.
Figure 4:
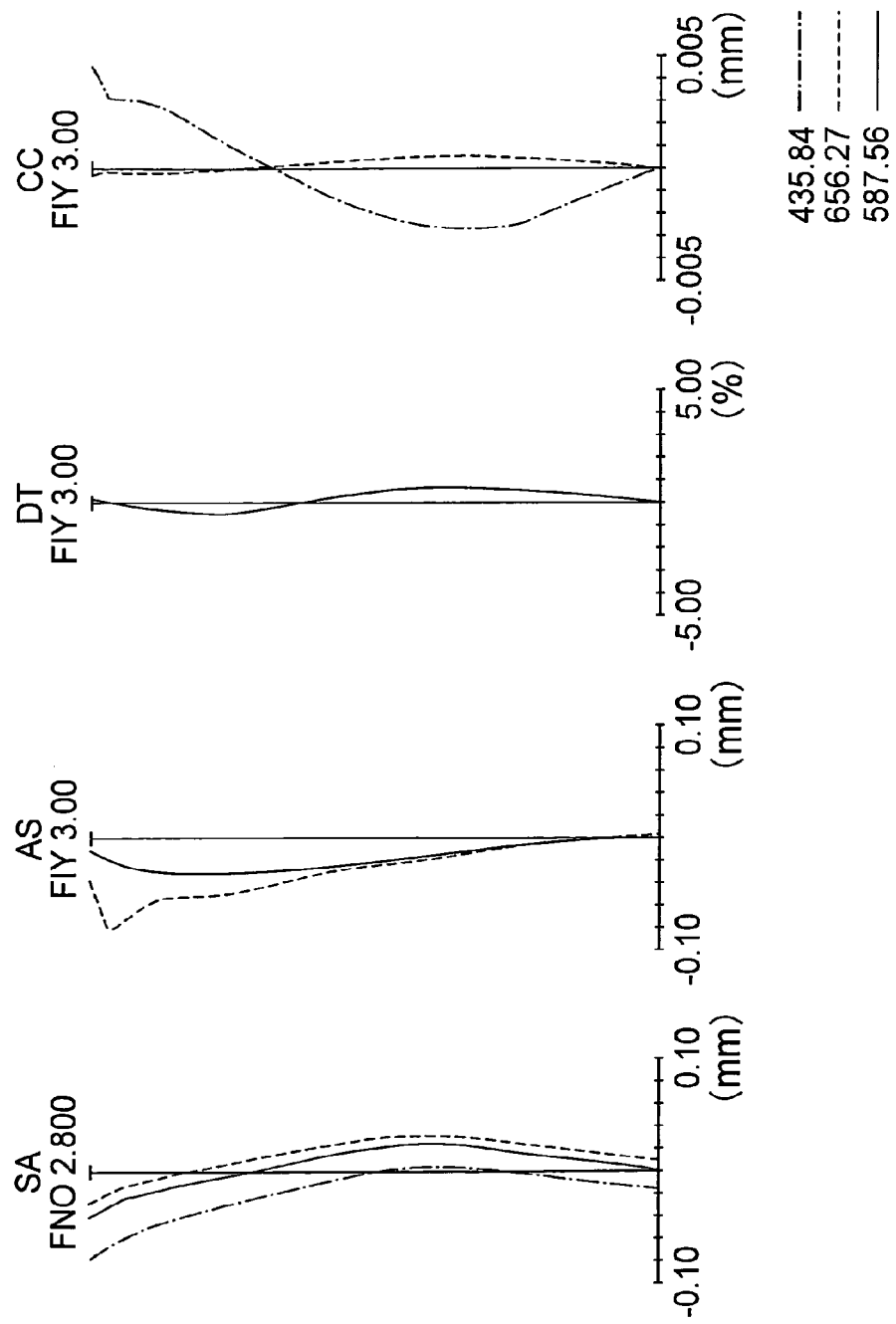
FIG. 4 is a diagram showing a spherical aberration (SA), an astigmatism (AS), a distortion (DT), and a chromatic aberration of magnification (CC) at the time of infinite object point focusing of the image pickup optical system according to the second embodiment of the present invention.

An image pickup optical system according to a second embodiment, as shown in FIG. 3, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a positive meniscus lens having a convex surface directed toward the image side. The fourth lens L4 is a positive meniscus lens having a convex surface directed toward the image side. The fifth lens L5 is a negative meniscus lens having a convex surface directed toward the image side.

An aspheric surface is provided to both surfaces of all the five lenses L1 to L5.

Figure 5:
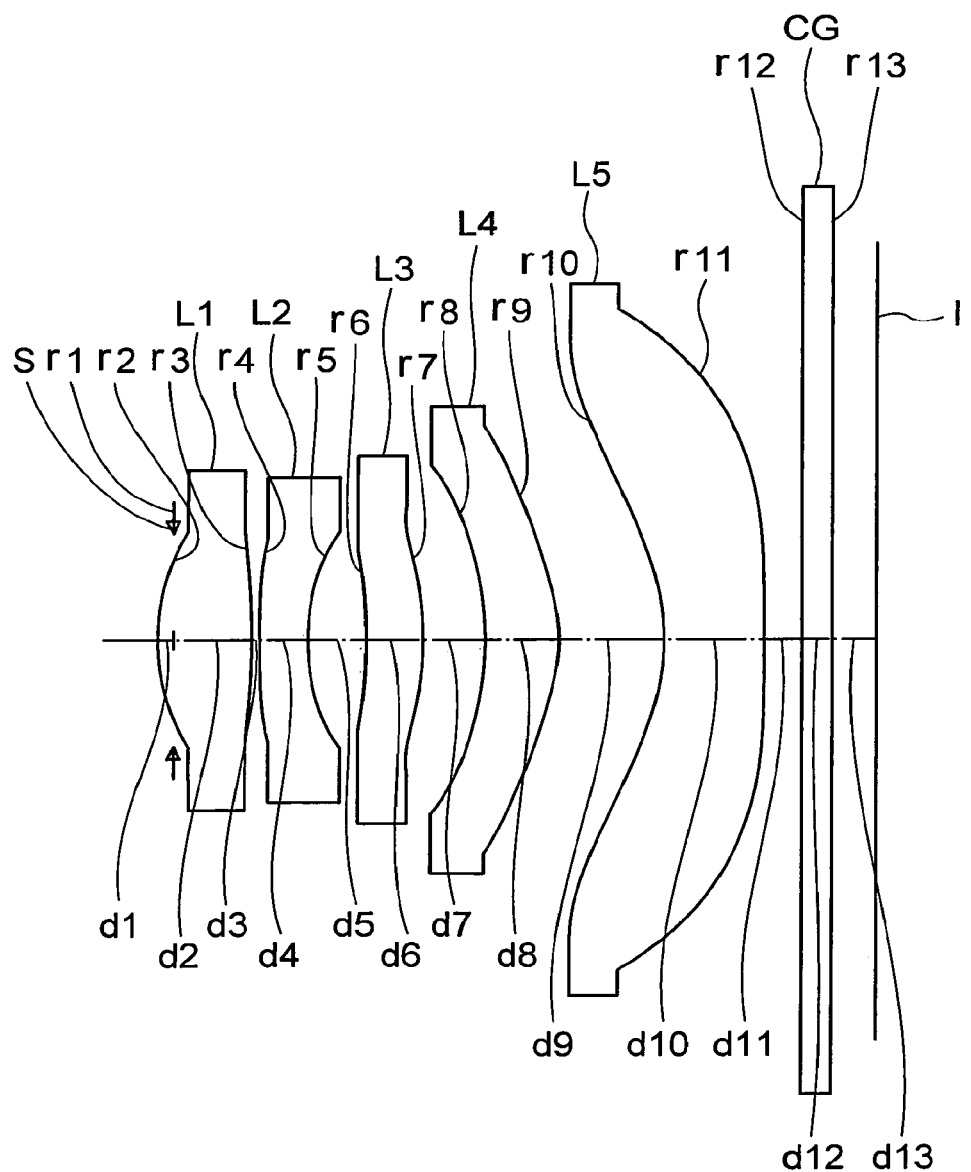
FIG. 5 is a cross-sectional view along an optical axis showing an optical arrangement at a time of infinite object point focusing of an image pickup optical system according to a third embodiment of the present invention.
Figure 6:
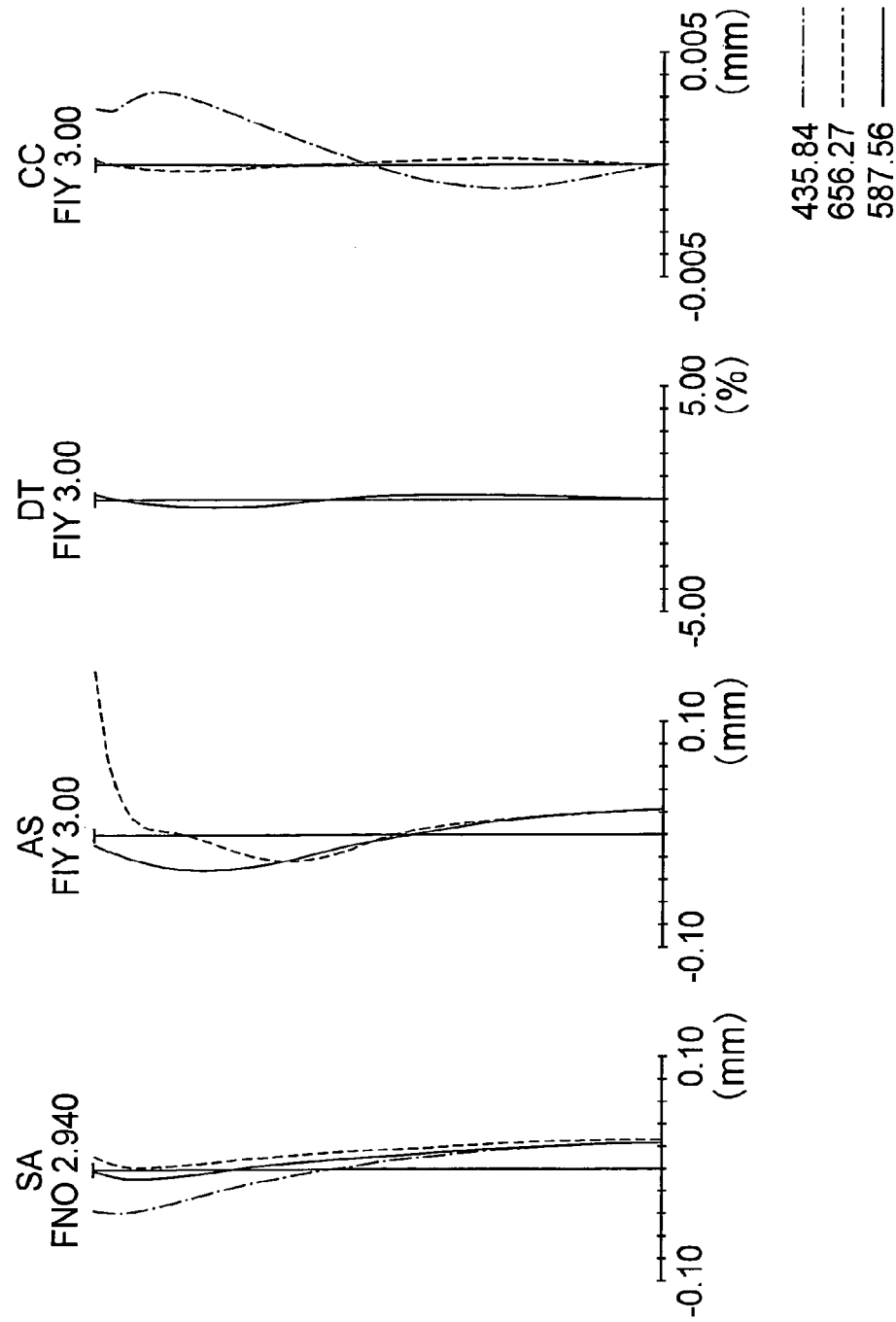
FIG. 6 is a diagram showing a spherical aberration (SA), an astigmatism (AS), a distortion (DT), and a chromatic aberration of magnification (CC) at the time of infinite object point focusing of the image pickup optical system according to the third embodiment of the present invention.

An image pickup optical system according to a third embodiment, as shown in FIG. 5, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a positive meniscus lens having a convex surface directed toward the image side. The fourth lens L4 is a positive meniscus lens having a convex surface directed toward the image side. The fifth lens L5 is a negative meniscus lens having a convex surface directed toward the image side.

An aspheric surface is provided to both surfaces of all the five lenses L1 to L5.

Figure 7:
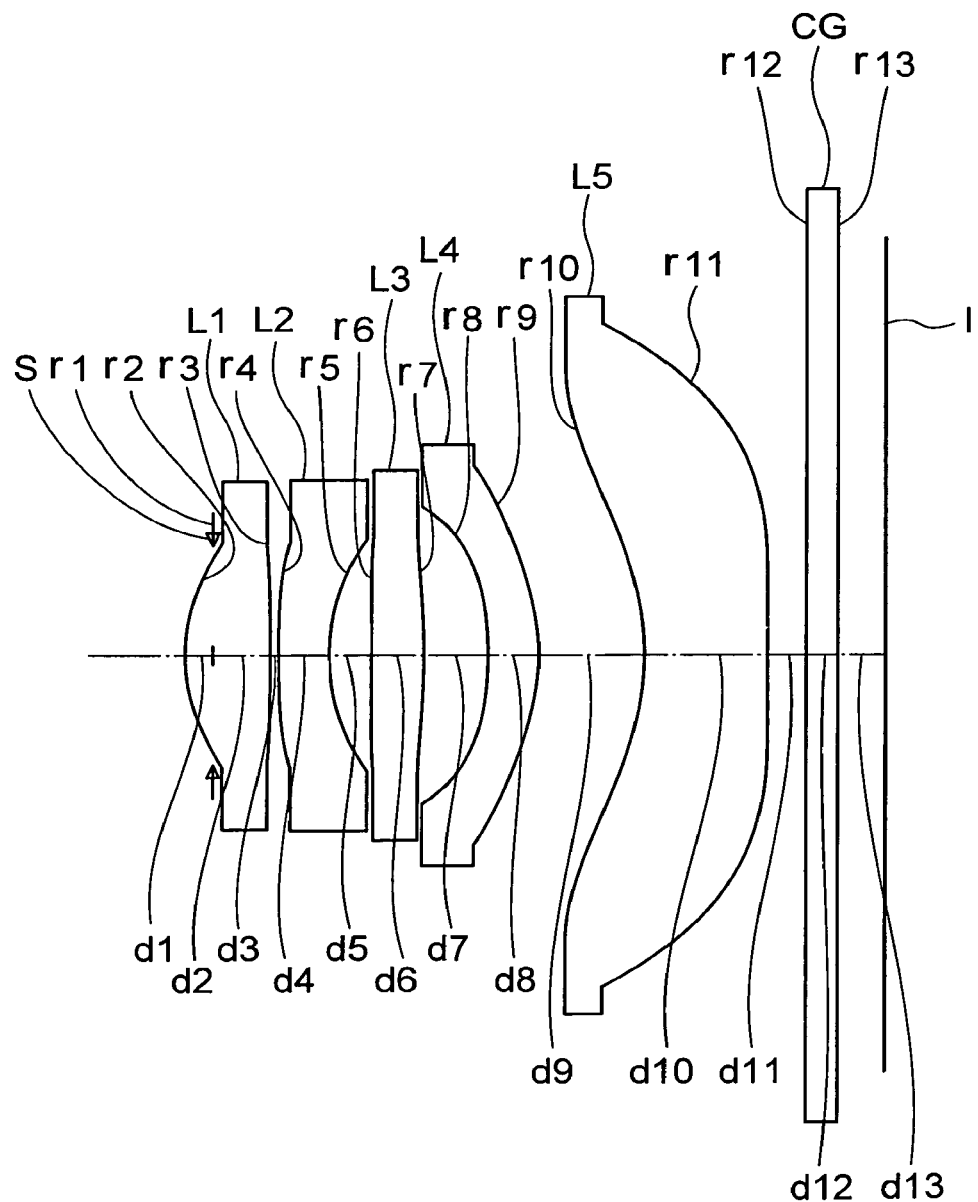
FIG. 7 is a cross-sectional view along an optical axis showing an optical arrangement at a time of infinite object point focusing of an image pickup optical system according to a fourth embodiment of the present invention.
Figure 8:
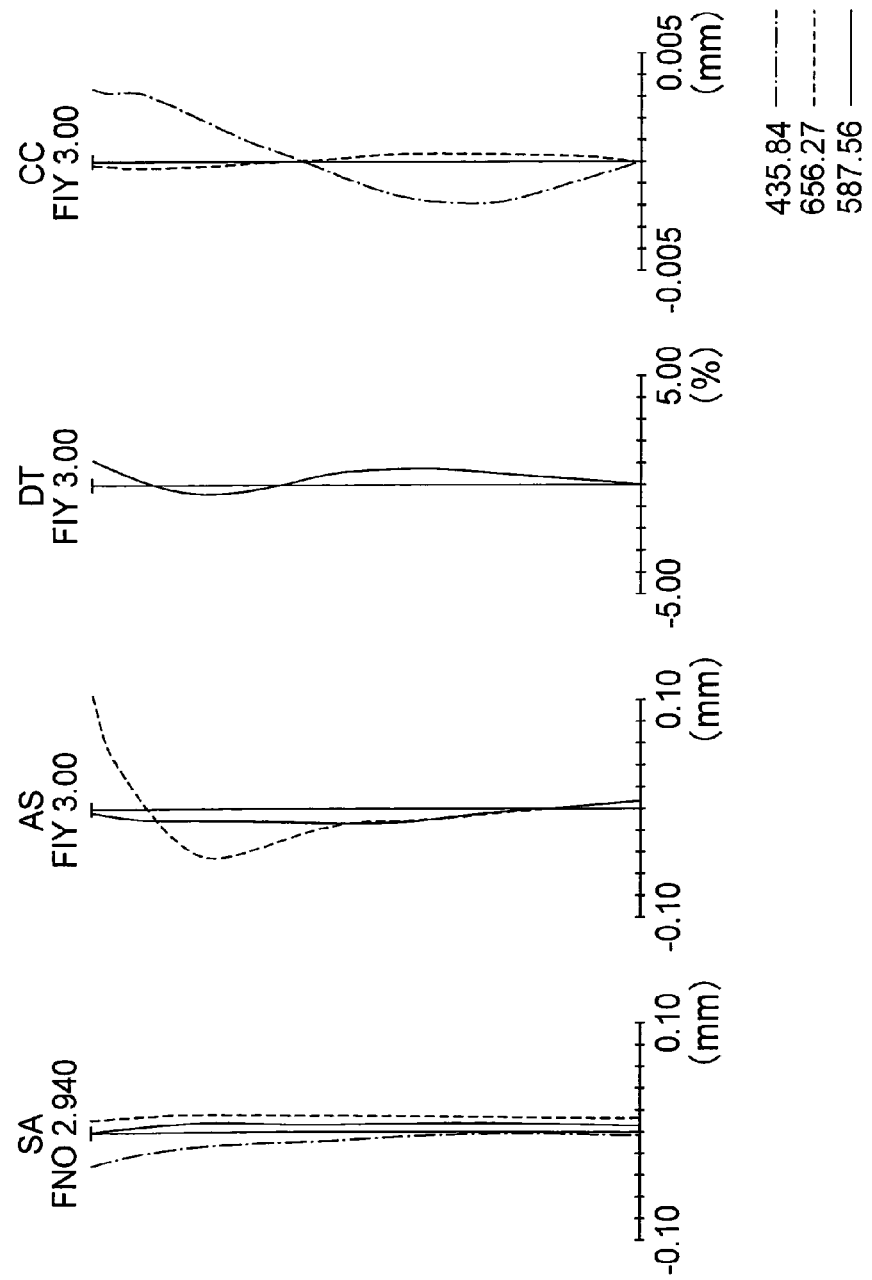
FIG. 8 is a diagram showing a spherical aberration (SA), an astigmatism (AS), a distortion (DT), and a chromatic aberration of magnification (CC) at the time of infinite object point focusing of the image pickup optical system according to the fourth embodiment of the present invention.

An image pickup optical system according to a fourth embodiment, as shown in FIG. 7, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a biconvex positive lens. The fourth lens L4 is a positive meniscus lens having a convex surface directed toward the image side. The fifth lens L5 is a negative meniscus lens having a convex surface directed toward the image side.

An aspheric surface is provided to both surfaces of all the five lenses L1 to L5.

Figure 9:
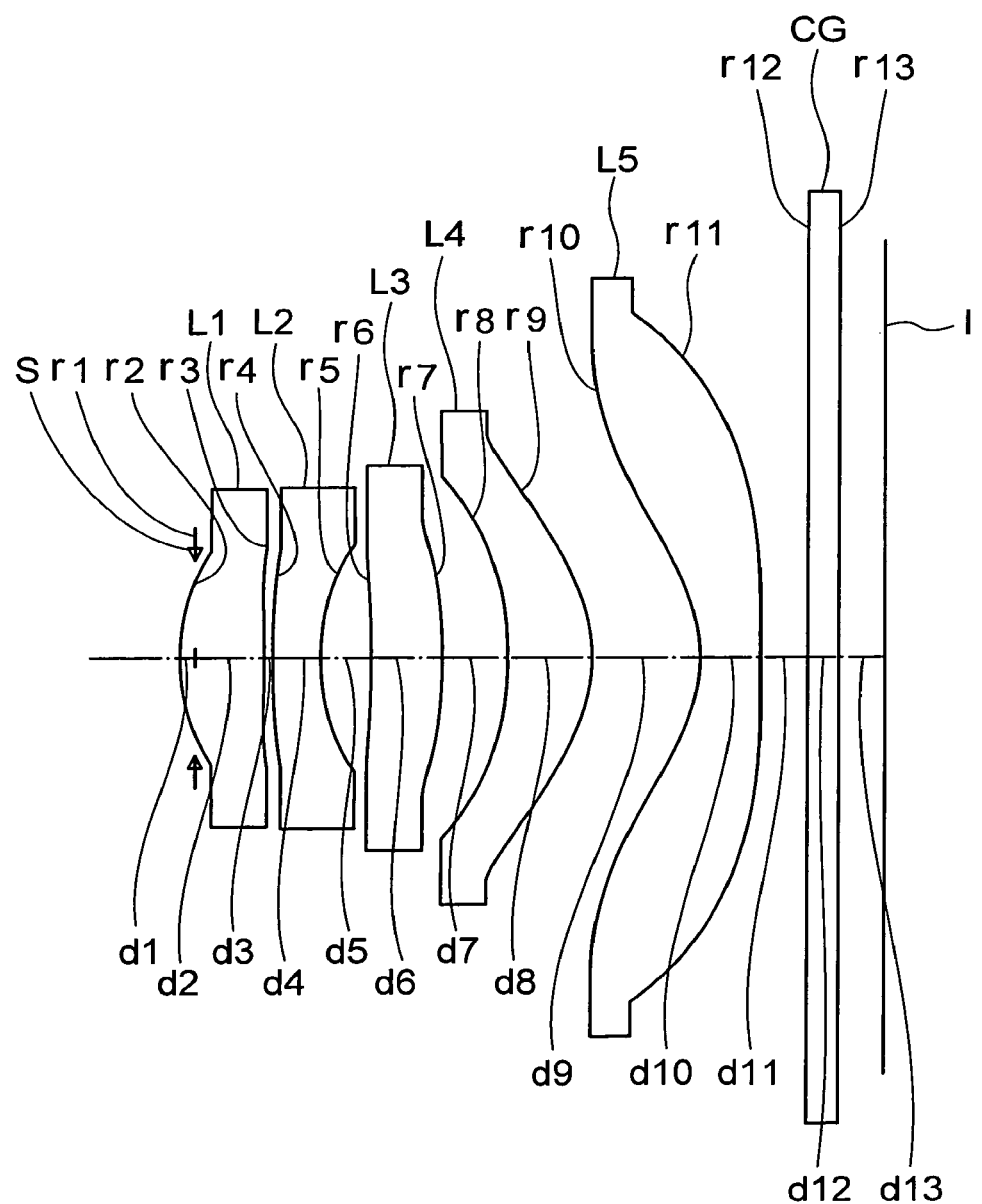
FIG. 9 is a diagram showing a cross-sectional view along an optical axis showing an optical arrangement at a time of infinite object point focusing of an image pickup optical system according to a fifth embodiment of the present invention.
Figure 10:
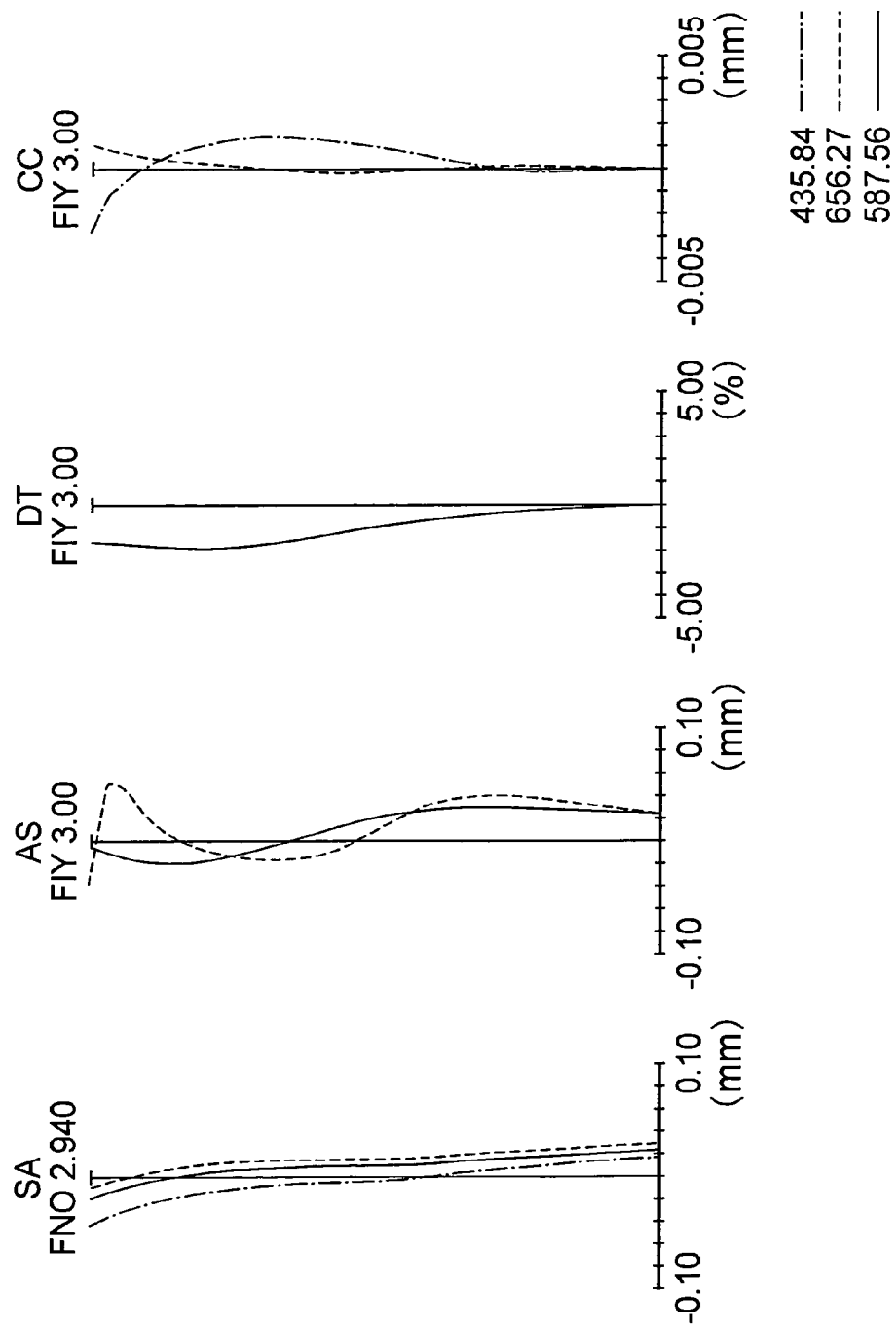
FIG. 10 is a diagram showing a spherical aberration (SA), an astigmatism (AS), a distortion (DT), and a chromatic aberration of magnification (CC) at the time of infinite object point focusing of the image pickup optical system according to the fifth embodiment of the present invention.

An image pickup optical system according to a fifth embodiment, as shown in FIG. 9, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a positive meniscus lens having a convex surface directed toward the image side. The fourth lens L4 is a positive meniscus lens having a convex surface directed toward the image side. The fifth lens L5 is a negative meniscus lens having a convex surface directed toward the image side.

An aspheric surface is provided to both surfaces of all the five lenses L1 to L5.

Figure 11:
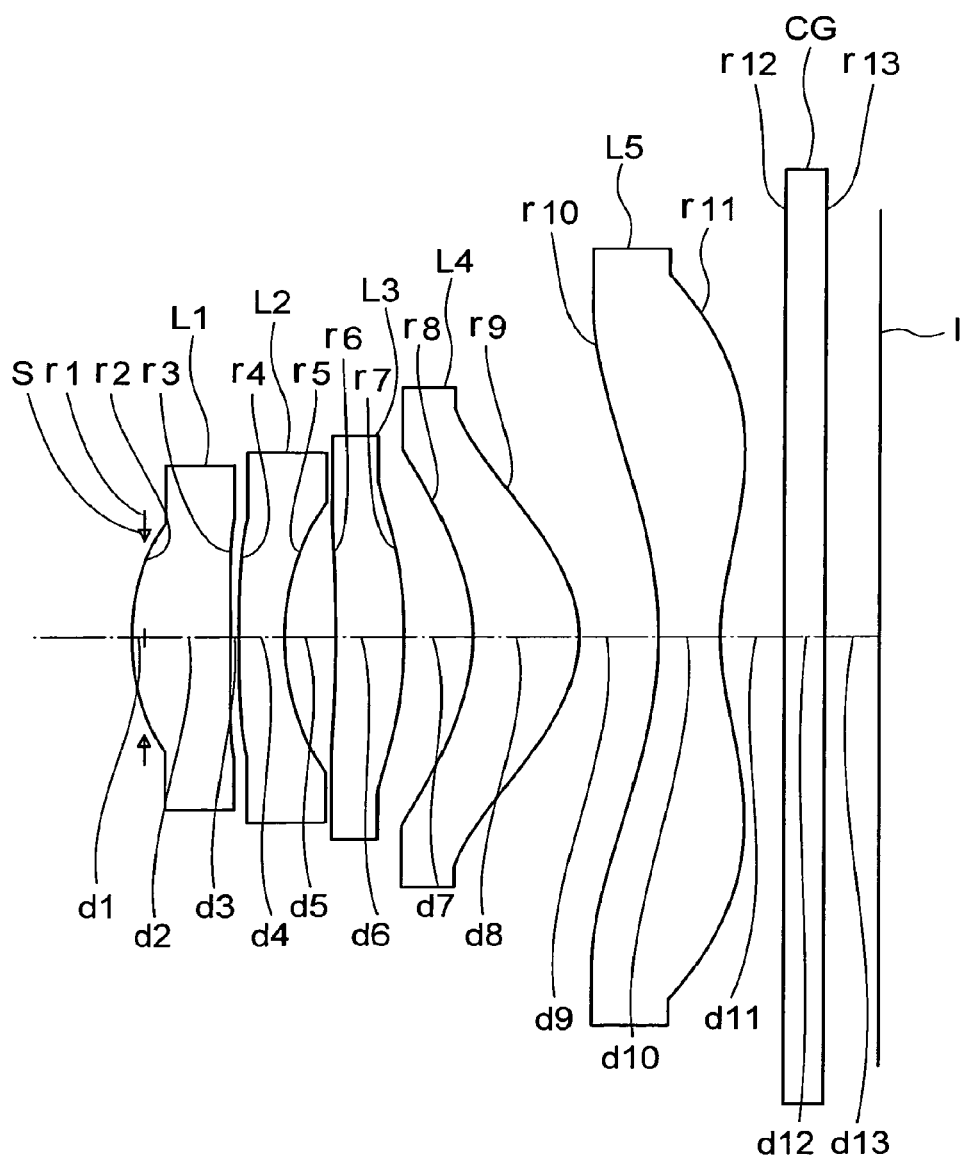
FIG. 11 is a diagram showing a cross-sectional view along an optical axis showing an optical arrangement at a time of infinite object point focusing of an image pickup optical system according to a sixth embodiment of the present invention.
Figure 12:
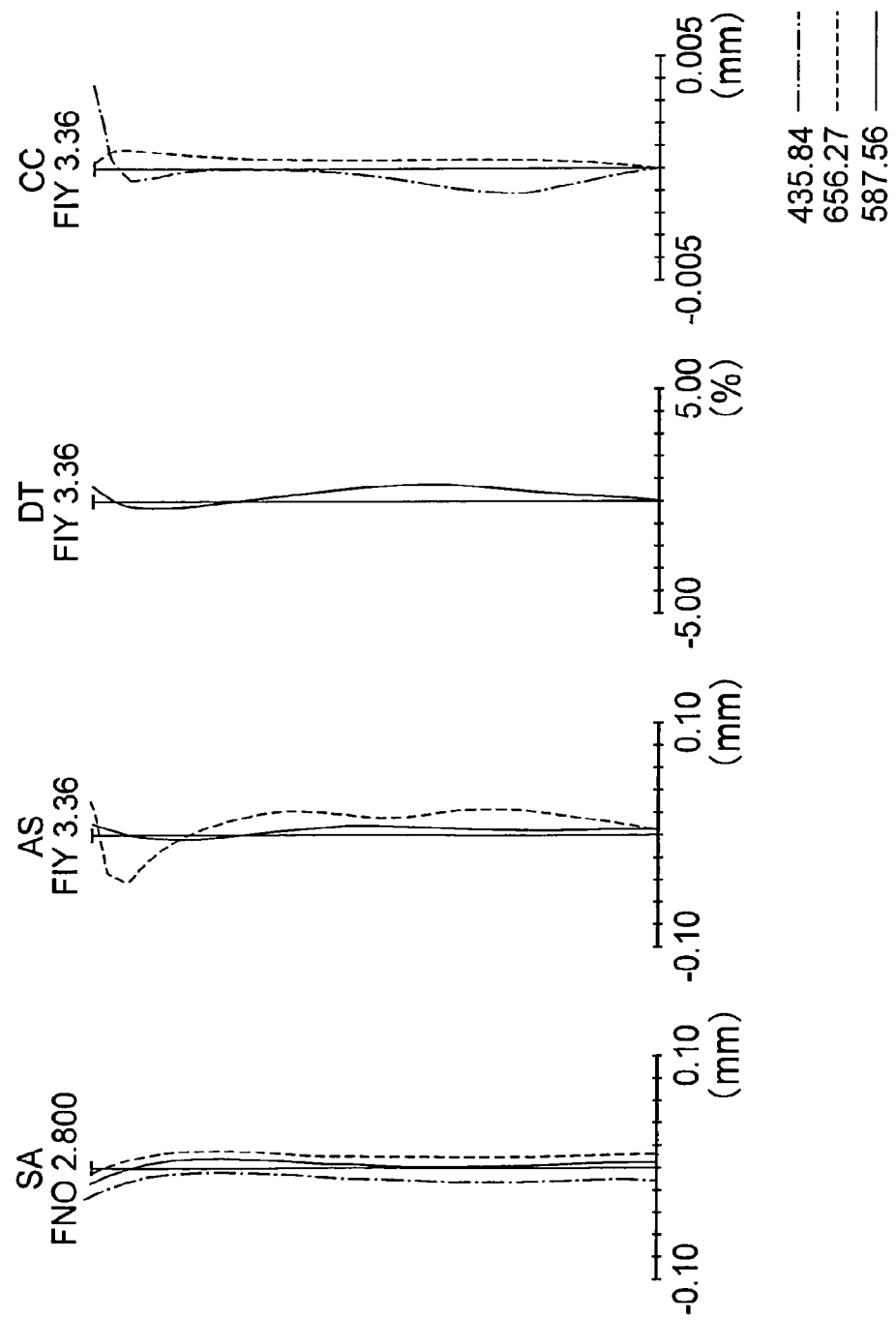
FIG. 12 is a diagram showing a spherical aberration (SA), an astigmatism (AS), a distortion (DT), and a chromatic aberration of magnification (CC) at the time of infinite object point focusing of the image pickup optical system according to the sixth embodiment of the present invention.

An image pickup optical system according to a sixth embodiment, as shown in FIG. 11, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a biconvex positive lens. The fourth lens L4 is a positive meniscus lens having a convex surface directed toward the image side. The fifth lens L5 is a biconcave negative lens.

An aspheric surface is provided to both surfaces of all the five lenses L1 to L5.

Figure 13:
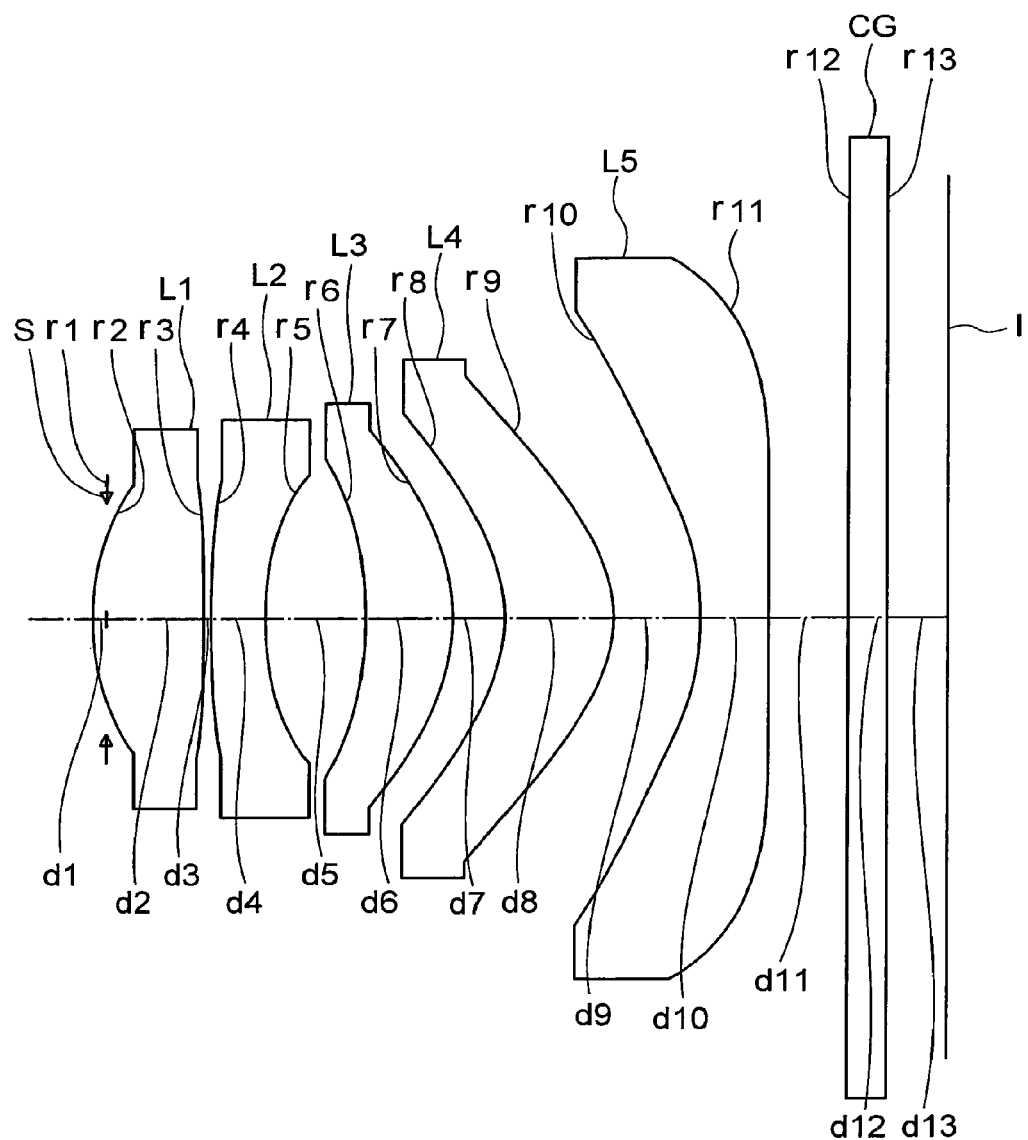
FIG. 13 is a diagram showing a cross-sectional view along an optical axis showing an optical arrangement at a time of infinite object point focusing of an image pickup optical system according to a seventh embodiment of the present invention.
Figure 14:
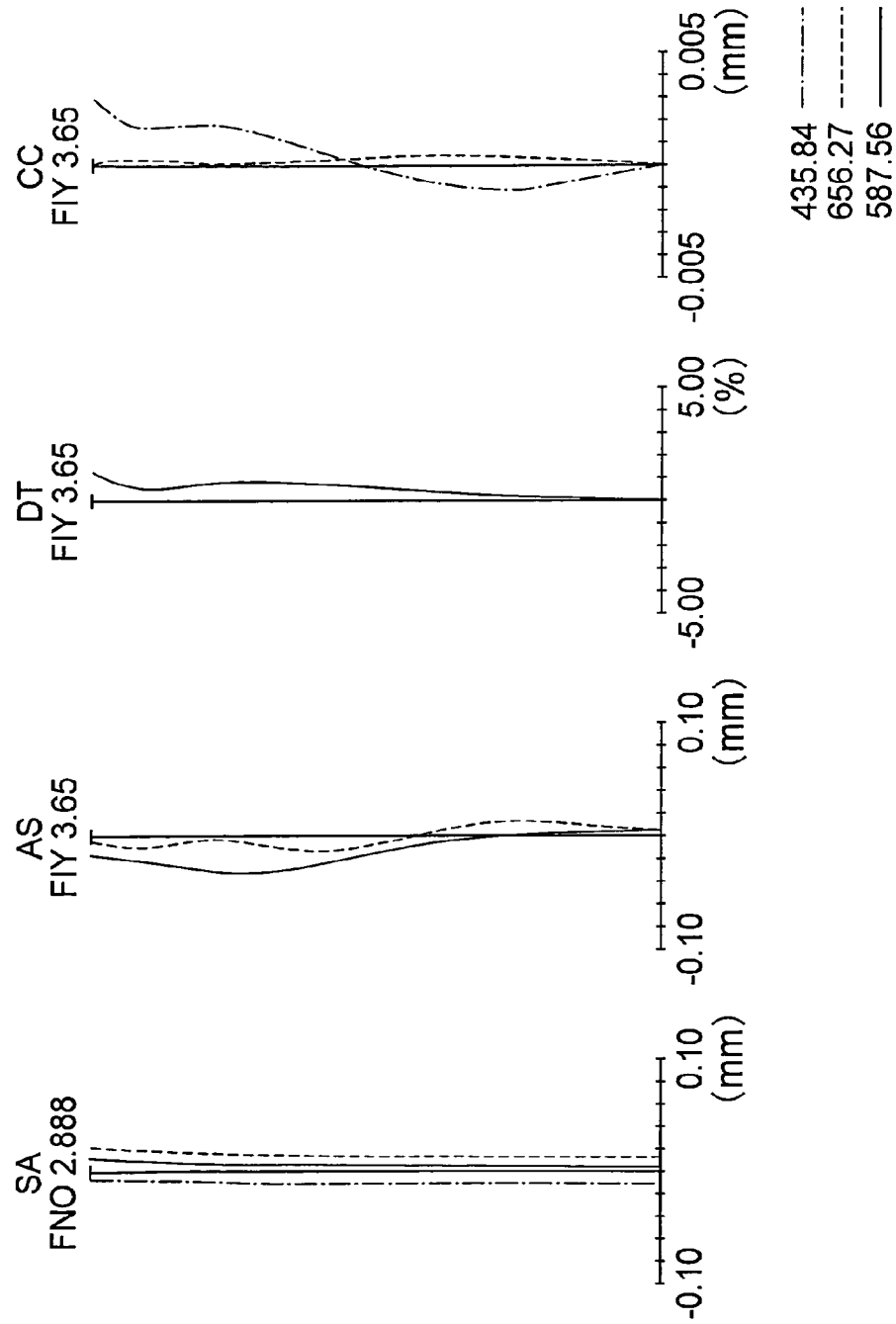
FIG. 14 is a diagram showing a spherical aberration (SA), an astigmatism (AS), a distortion (DT), and a chromatic aberration of magnification (CC) at the time of infinite object point focusing of the image pickup optical system according to the seventh embodiment of the present invention.

An image pickup optical system according to a seventh embodiment, as shown in FIG. 13, in order from the object side, includes an aperture stop S, a first lens L1 having a positive refracting power, a second lens L2 having a negative refracting power, a third lens L3 having a positive refracting power, a fourth lens L4 having a positive refracting power, and a fifth lens L5 having a negative refracting power.

The first lens L1 is a biconvex positive lens. The second lens L2 is a negative meniscus lens having a convex surface directed toward the object side. The third lens L3 is a positive meniscus lens having a convex surface directed toward the image side. The fourth lens L4 is a positive meniscus lens having a convex surface directed toward the image side. The fifth lens L5 is a biconcave negative lens.

An aspheric surface is provided to both surfaces of the first lens L1, the second lens L2, the fourth lens L4, and the fifth lens L5, and a surface on the image side of the third lens L3.

Numerical data of each embodiment described above is shown below. Apart from symbols described above, f denotes a focal length of the overall image pickup optical system, $F_{NO}$ denotes an F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens, Fno. denotes F number, f denotes a focal length of total optical system, * denotes an aspheric surface.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

"S" means that the surface is an aperture stop.

Example 1 unit mm
Surface data

| Surface no. | r | d | nd | vd |
|---|---|---|---|---|
| object plane | ∞ | ∞ | | |
| 1 (S) | ∞ | −0.16 | | |
| 2* | 1.514 | 0.61 | 1.53071 | 55.71 |
| 3* | −8.512 | 0.06 | | |
| 4* | −77.883 | 0.30 | 1.63260 | 23.28 |
| 5* | 2.165 | 0.39 | | |
| 6* | 2.008 | 0.31 | 1.58393 | 30.22 |
| 7* | 2.362 | 0.64 | | |
| 8* | −5.337 | 0.56 | 1.53071 | 55.71 |
| 9* | −1.247 | 0.47 | | |
| 10* | −1.175 | 0.55 | 1.53071 | 55.71 |
| 11* | 52.979 | 0.25 | | |
| 12 | ∞ | 0.20 | 1.51633 | 64.14 |
| 13 | ∞ | 0.32 | | |
| Image plane (Light receiving surface) | ∞ | | | |

Aspherical surface data

2nd surface k = 0.437
A4 = −1.52719e−02, A6 = −2.10431e−02

3rd surface k = 7.266
A4 = 1.32557e−01, A6 = −1.59129e−02

4th surface k = 1.079
A4 = 1.22858e−01, A6 = 4.14234e−02, A8 = −2.33656e−02

5th surface k = 3.268
A4 = −5.43689e−02, A6 = 1.07848e−01, A8 = −5.00662e−02

6th surface k = −11.164
A4 = 5.89647e−03, A6 = −4.95146e−02, A8 = 3.70178e−02,
A10 = −1.95327e−02

7th surface k = 0.009
A4 = −9.63662e−02, A6 = 2.41469e−02, A8 = −1.08413e−02

8th surface k = 0.562
A4 = −8.57895e−02, A6 = 3.88476e−02, A8 = −2.04390e−02

9th surface k = −1.040
A4 = −2.78432e−03, A6 = 2.26031e−02, A8 = 3.85116e−03,
A10 = −2.11278e−03

10th surface k = −1.147
A4 = 7.76084e−02, A6 = −7.56962e−03, A8 = 1.86176e−04,
A10 = 5.78786e−07

11th surface k = −99.772
A4 = −2.96309e−02, A6 = 7.64446e−04, A8 = −2.13386e−04,
A10 = 3.93374e−07

Numerical data

| | |
|---|---|
| fb (in air) | 0.71 |
| Lens total length (in air) | 4.59 |
| Total system (fixed) focal length | 4.23 |

Example 2 unit mm
Surface data

| Surface no. | r | d | nd | vd |
|---|---|---|---|---|
| object plane | ∞ | ∞ | | |
| 1 (S) | ∞ | −0.15 | | |
| 2* | 1.562 | 0.62 | 1.54454 | 55.93 |
| 3* | −5.723 | 0.04 | | |
| 4* | 5.330 | 0.33 | 1.63494 | 23.91 |
| 5* | 1.462 | 0.29 | | |
| 6* | −41.633 | 0.34 | 1.60352 | 28.21 |
| 7* | −6.459 | 0.51 | | |
| 8* | −2.971 | 0.33 | 1.60352 | 28.21 |
| 9* | −1.697 | 0.58 | | |
| 10* | −1.453 | 0.81 | 1.54454 | 55.93 |
| 11* | −7.483 | 0.25 | | |
| 12 | ∞ | 0.20 | 1.51633 | 64.14 |
| 13 | ∞ | 0.31 | | |
| Image plane (Light receiving surface) | ∞ | | | |

Aspherical surface data

2nd surface k = −0.251
A4 = −6.57688e−03, A6 = −1.08256e−02, A8 −2.88799e−02,
A10 = −5.91158e−03

3rd surface k = 5.554
A4 = 6.34805e−02, A6 = −1.12391e−01, A8 = 1.01639e−01,
A10 = −5.33485e−02

4th surface k = −171.109
A4 = 5.52591e−02, A6 = −5.59237e−02, A8 = 1.30568e−01,
A10 = −5.13041e−02

5th surface k = −0.238
A4 = −1.73099e−01, A6 = 2.88831e−01, A8 = −2.17465e−01,
A10 = 1.23197e−01

6th surface k = 43.598
A4 = −8.87746e−02, A6 = −7.59662e−02, A8 = 2.87338e−01,
A10 = −1.19189e−01

7th surface k = 25.501
A4 = −5.60907e−02, A6 = −6.79959e−02, A8 = 1.24828e−01,
A10 = 3.11344e−02

-continued

8th surface k = 0.363
A4 = −4.35137e−02, A6 = −4.64459e−02, A8 = −8.27315e−03,
A10 = 1.12264e−03

9th surface k = 0.173
A4 = 6.74807e−02, A6 = 1.99499e−02, A8 = −6.40927e−03,
A10 = 1.56685e−03

10th surface k = −1.578
A4 = 5.99798e−02, A6 = −8.31077e−03, A8 = 7.03202e−04,
A10 = −5.05168e−05

11th surface k = −200.000
A4 = −2.41208e−02, A6 = −7.90557e−04, A8 = −3.92103e−04,
A10 = 4.61755e−05

| Numerical data | |
|---|---|
| fb (in air) | 0.69 |
| Lens total length (in air) | 4.54 |
| Total system (fixed) focal length | 4.28 |

Example 3

| unit mm Surface data | | | | |
|---|---|---|---|---|
| Surface no. | r | d | nd | vd |
| object plane | ∞ | ∞ | | |
| 1 (S) | ∞ | −0.10 | | |
| 2* | 1.618 | 0.62 | 1.53071 | 55.71 |
| 3* | −4.961 | 0.05 | | |
| 4* | 5.710 | 0.33 | 1.63494 | 23.91 |
| 5* | 1.563 | 0.39 | | |
| 6* | −3.756 | 0.39 | 1.53071 | 55.71 |
| 7* | −2.061 | 0.42 | | |
| 8* | −1.845 | 0.50 | 1.60352 | 28.21 |
| 9* | −1.580 | 0.73 | | |
| 10* | −1.614 | 0.67 | 1.53071 | 55.71 |
| 11* | −7.980 | 0.25 | | |
| 12 | ∞ | 0.20 | 1.51633 | 64.14 |
| 13 | ∞ | 0.31 | | |
| Image plane (Light receiving surface) | ∞ | | | |

Aspherical surface data

2nd surface k = −0.170
A4 = −1.00356e−02, A6 = −3.81996e−03, A8 = 5.51225e−03,
A10 = −2.99796e−03

3rd surface k = 7.114
A4 = 7.85575e−02, A6 = 1.21370e−02, A8 = 5.33615e−03,
A10 = 1.31206e−02

4th surface k = −113.321
A4 = 6.01996e−02, A6 = 4.26326e−03, A8 = 1.30646e−01,
A10 = −9.05304e−02

5th surface k = 0.790
A4 = −1.32069e−01, A6 = 1.44559e−01, A8 = −6.94869e−02,
A10 = 2.98790e−02

6th surface k = −22.022
A4 = −1.85512e−02, A6 = 6.79936e−02, A8 = 8.52940e−04,
A10 = 4.87794e−04

7th surface k = −5.915
A4 = 1.50114e−02, A6 = 6.95824e−02, A8 = −5.46294e−04,
A10 = −2.72286e−03

8th surface k = −2.318
A4 = 1.39851e−02, A6 = 9.33341e−02, A8 = −1.01201e−01,
A10 = 3.11984e−02, A12 = −2.96310e−03

9th surface k = −0.109
A4 = 4.90824e−02, A6 = 8.55630e−02, A8 = −4.72267e−02,
A10 = 8.616696e−03, A12 = 1.971146e−04

10th surface k = −1.005
A4 = 5.28628e−02, A6 = −5.86815e−03, A8 = 8.46175e−04,
A10 = −8.07449e−05, A12 = 3.71532e−07

11th surface k = −445.082
A4 = −2.58354e−02, A6 = 1.51787e−03, A8 = −3.84860e−04,
A10 = 2.54376e−05, A12 = 9.34150e−08

| Numerical data | |
|---|---|
| fb (in air) | 0.71 |
| Lens total length (in air) | 4.82 |
| Total system (fixed) focal length | 4.47 |

Example 4

| unit mm Surface data | | | | |
|---|---|---|---|---|
| Surface no. | r | d | nd | vd |
| object plane | ∞ | ∞ | | |
| 1 (S) | ∞ | −0.18 | | |
| 2* | 1.449 | 0.55 | 1.53071 | 55.71 |
| 3* | −6.171 | 0.06 | | |
| 4* | 5.948 | 0.33 | 1.63494 | 23.91 |
| 5* | 1.443 | 0.28 | | |
| 6* | 19.919 | 0.34 | 1.60352 | 28.21 |
| 7* | −19.991 | 0.43 | | |
| 8* | −2.719 | 0.34 | 1.60352 | 28.21 |
| 9* | −1.699 | 0.70 | | |
| 10* | −1.722 | 0.81 | 1.53071 | 55.71 |
| 11* | −11.154 | 0.25 | | |
| 12 | ∞ | 0.20 | 1.51633 | 64.14 |
| 13 | ∞ | 0.33 | | |
| Image plane (Light receiving surface) | ∞ | | | |

Aspherical surface data

2nd surface k = −0.117
A4 = −1.18556e−03, A6 = −6.58231e−03, A8 = −2.32639e−02,
A10 = 3.01692e−02

3rd surface k = −11.751
A4 = 7.53795e−02, A6 = −9.31862e−02, A8 = 1.10250e−01,
A10 = 4.78478e−03

-continued

4th surface k = −174.630
A4 = 4.88256e−02, A6 = −5.68098e−02, A8 = 1.46920e−01,
A10 = −3.82802e−02
5th surface k = −0.092
A4 = −1.63449e−01, A6 = 2.78687e−01, A8 = −2.54070e−01,
A10 = 1.68844e−01
6th surface k = 41.914
A4 = −7.82489e−02, A6 = −5.97126e−02, A8 = 2.95170e−01,
A10 = −1.61574e−01
7th surface k = 101.771
A4 = −6.86789e−02, A6 = −8.41227e−02, A8 = 1.10130e−01,
A10 = 3.83175e−02
8th surface k = 0.915
A4 = −4.70200e−02, A6 = −6.88395e−02, A8 = −2.66452e−03,
A10 = −2.39501e−02
9th surface k = 0.332
A4 = 6.15674e−02, A6 = 2.48501e−02, A8 = −4.90039e−03,
A10 = 2.29803e−03
10th surface k = −1.112
A4 = 5.82775e−02, A6 = −7.14819e−03, A8 = 6.34866e−04,
A10 = −4.04834e−05
11th surface k = −636.320
A4 = −2.12631e−02, A6 = −1.50144e−03, A8 = −4.38711e−04,
A10 = 6.36103e−05

| Numerical data | |
|---|---|
| fb (in air) | 0.71 |
| Lens total length (in air) | 4.55 |
| Total system (fixed) focal length | 4.37 |

Example 5

| unit mm Surface data | | | | |
|---|---|---|---|---|
| Surface no. | r | d | nd | vd |
| object plane | ∞ | ∞ | | |
| 1 (S) | ∞ | −0.10 | | |
| 2* | 1.566 | 0.55 | 1.54454 | 55.93 |
| 3* | −13.551 | 0.06 | | |
| 4* | 6.440 | 0.33 | 1.63494 | 23.91 |
| 5* | 1.754 | 0.33 | | |
| 6 | −10.574 | 0.47 | 1.53071 | 55.71 |
| 7* | −3.536 | 0.43 | | |
| 8* | −2.442 | 0.57 | 1.54454 | 55.93 |
| 9* | −1.247 | 0.70 | | |
| 10* | −1.071 | 0.41 | 1.54454 | 55.93 |
| 11* | −4.779 | 0.30 | | |

-continued

| | | | | |
|---|---|---|---|---|
| 12 | ∞ | 0.20 | 1.51633 | 64.14 |
| 13 | ∞ | 0.30 | | |
| Image plane (Light receiving surface) | ∞ | | | |

Aspherical surface data

2nd surface k = 0.118
A4 = 3.51981e−03, A6 = 3.15415e−04, A8 = 2.85742e−02
3rd surface k = −49.163
A4 = 9.91226e−02, A6 = −1.01062e−01, A8 = 1.87672e−01
4th surface k = 6.287
A4 = 4.22317e−02, A6 = −1.42760e−01, A8 = 2.38264e−01,
A10 = −3.19567e−02
5th surface k = 1.391
A4 = −6.20887e−02, A6 = 2.25292e−02, A8 = −9.94067e−02,
A10 = 1.30287e−01
7th surface k = −3.816
A4 = 1.98999e−02, A6 = −5.49857e−02, A8 = 2.73220e−02,
A10 = 1.14483e−02
8th surface k = 1.870
A4 = −5.96485e−02, A6 = 1.39147e−01, A8 = −1.30303e−01,
A10 = 4.49195e−02
9th surface k = −0.461
A4 = −2.79628e−03, A6 = 1.03908e−01, A8 = −3.66048e−02,
A10 = 6.17661e−03
10th surface k = −1.885
A4 = 5.81773e−02, A6 = −6.68551e−03, A8 = 1.30080e−04,
A10 = 8.02451e−06, A12 = 8.92094e−07
11th surface k = −150.548
A4 = −1.68889e−02, A6 = 5.44836e−04, A8 = −5.25831e−04,
A10 = 1.26296e−04, A12 = −1.02406e−05

| Numerical data | |
|---|---|
| fb (in air) | 0.76 |
| Lens total length (in air) | 4.61 |
| Total system (fixed) focal length | 4.09 |

Example 6

| unit mm Surface data | | | | |
|---|---|---|---|---|
| Surface no. | r | d | nd | vd |
| object plane | ∞ | ∞ | | |
| 1 (S) | ∞ | −0.10 | | |
| 2* | 1.895 | 0.70 | 1.54454 | 55.93 |
| 3* | −35.770 | 0.05 | | |
| 4* | 4.541 | 0.34 | 1.63494 | 23.91 |
| 5* | 1.763 | 0.36 | | |
| 6* | 554.313 | 0.49 | 1.53071 | 55.71 |
| 7* | −4.923 | 0.49 | | |
| 8* | −2.316 | 0.77 | 1.54454 | 55.93 |
| 9* | −1.132 | 0.57 | | |

-continued

| | | | | |
|---|---|---|---|---|
| 10* | −3.874 | 0.44 | 1.54454 | 55.93 |
| 11* | 2.329 | 0.46 | | |
| 12 | ∞ | 0.30 | 1.51633 | 64.14 |
| 13 | ∞ | 0.40 | | |
| Image plane (Light receiving surface) | ∞ | | | |

Aspherical surface data

2nd surface $k = -0.417$
$A4 = 2.30722e{-}02, A6 = -1.57621e{-}02, A8 = 2.42845e{-}02$
3rd surface $k = 0.027$
$A4 = 8.14577e{-}04, A6 = 3.23114e{-}02, A8 = 1.84596e{-}02$
4th surface $k = -41.241$
$A4 = -5.43173e{-}02, A6 = 6.47387e{-}02, A8 = -9.99442e{-}03,$
$A10 = -6.30963e{-}03$
5th surface $k = 0.803$
$A4 = -1.26827e{-}01, A6 = 8.91246e{-}02, A8 = -5.28834e{-}02,$
$A10 = 6.13521e{-}03$
6th surface $k = -1.264$
$A4 = -3.67651e{-}02, A6 = 4.83340e{-}04, A8 = 2.45824e{-}02,$
$A10 = -7.23457e{-}03$
7th surface $k = -3.287$
$A4 = -5.22028e{-}02, A6 = 3.97193e{-}02, A8 = -3.88474e{-}02,$
$A10 = 1.79400e{-}02$
8th surface $k = 1.102$
$A4 = -9.69947e{-}02, A6 = 1.27478e{-}01, A8 = -5.71162e{-}02,$
$A10 = 1.24910e{-}02$
9th surface $k = -0.868$
$A4 = 3.03167e{-}02, A6 = 5.02812e{-}03, A8 = 9.35928e{-}03,$
$A10 = -2.37338e{-}03$
10th surface $k = -0.243$
$A4 = 6.13107e{-}03, A6 = 2.18227e{-}04, A8 = 2.20085e{-}04,$
$A10 = -2.21650e{-}05$
11th surface $k = -9.257$
$A4 = -3.71806e{-}02, A6 = 6.26959e{-}03, A8 = -8.14906e{-}04,$
$A10 = 4.31811e{-}05$ Numerical data

| | |
|---|---|
| fb (in air) | 1.06 |
| Lens total length (in air) | 5.28 |
| Total system (fixed) focal length | 4.32 |

Example 7 unit mm
Surface data

| Surface no. | r | d | nd | vd |
|---|---|---|---|---|
| object plane | ∞ | ∞ | | |
| 1 (S) | ∞ | −0.10 | | |
| 2* | 2.100 | 0.85 | 1.53071 | 55.71 |
| 3* | −10.000 | 0.05 | | |
| 4* | 9.391 | 0.40 | 1.63494 | 23.91 |
| 5* | 2.428 | 0.76 | | |
| 6* | −3.409 | 0.66 | 1.53071 | 55.71 |
| 7* | −1.539 | 0.38 | | |
| 8* | −1.402 | 0.83 | 1.53071 | 55.71 |
| 9* | −1.300 | 0.66 | | |
| 10* | −1.908 | 0.50 | 1.53071 | 55.71 |
| 11* | 47.477 | 0.60 | | |
| 12 | ∞ | 0.30 | 1.51633 | 64.14 |
| 13 | ∞ | 0.45 | | |
| Image plane (Light receiving surface) | ∞ | | | |

Aspherical surface data

2nd surface $k = -1.154$
$A4 = 1.46019e{-}02, A6 = 8.67027e{-}04, A8 = -1.00000e{-}03$
3rd surface $k = -5.000$
$A4 = 7.83820e{-}03, A6 = 2.24308e{-}04, A8 = -1.09538e{-}04$
4th surface $k = 3.593$
$A4 = -1.93960e{-}02, A6 = 1.25120e{-}02, A8 = 5.66178e{-}04$
5th surface $k = 1.505$
$A4 = -3.04522e{-}02, A6 = 1.15182e{-}02, A8 = 1.85302e{-}04$
6th surface $k = 1.351$
$A4 = -1.00000e{-}02, A6 = 1.30000e{-}03$
7th surface $k = -1.575$
$A4 = 2.33107e{-}02, A6 = -5.69157e{-}03$
8th surface $k = -0.869$
$A4 = 5.99547e{-}02, A6 = -6.95207e{-}03, A8 = -4.49331e{-}04$
9th surface $k = -1.259$
$A4 = 1.00000e{-}02, A6 = 1.00000e{-}03$
10th surface $k = -0.818$
$A4 = 4.38227e{-}02, A6 = -4.00871e{-}03, A8 = -2.87456e{-}05,$
$A10 = 1.78791e{-}05$
11th surface $k = 15.000$
$A4 = -8.66144e{-}03, A6 = 1.01133e{-}03, A8 = -1.84966e{-}04,$
$A10 = 5.56796e{-}06$ Numerical data

| | |
|---|---|
| fb (in air) | 1.25 |
| Lens total length (in air) | 6.35 |
| Total system (fixed) focal length | 5.43 |

Values of conditional expressions in each of embodiments are shown below:

| | |
|---|---|
| Expression (1) | f4/f |
| Expression (2) | f3/f4 |
| Expression (3) | f1/f |
| Expression (4) | f3/f |
| Expression (5) | \|(SAG4AS − SAG4AA)/4AR\| |
| Expression (6) | \|(SAG4BS − SAG4BA)/4BR\| |
| Expression (7) | αi |

-continued

|  | Example1 | Example2 | Example3 | Example4 |
|---|---|---|---|---|
| f | 4.23 | 4.28 | 4.47 | 4.37 |
| f1 | 2.46 | 2.31 | 2.37 | 2.26 |
| f2 | −3.28 | −3.25 | −3.47 | −3.06 |
| f3 | 17.13 | 12.52 | 7.94 | 16.45 |
| f4 | 2.91 | 5.93 | 10.54 | 6.61 |
| f5 | −2.15 | −3.46 | −3.94 | −3.94 |
| F NO | 2.80 | 2.80 | 2.94 | 2.94 |
| Expression (1) | 0.69 | 1.38 | 2.36 | 1.51 |
| Expression (2) | 5.89 | 2.11 | 0.75 | 2.49 |
| Expression (3) | 0.58 | 0.54 | 0.53 | 0.52 |
| Expression (4) | 4.06 | 2.92 | 1.78 | 3.76 |
| Expression (5) | 0.005 | 0.004 | 0.013 | 0.004 |
| Expression (6) | 0.062 | 0.021 | 0.040 | 0.014 |
| Expression (7) | 26 | 26 | 24 | 25 |

|  | Example5 | Example6 | Example7 |
|---|---|---|---|
| f | 4.09 | 4.32 | 5.43 |
| f1 | 2.60 | 3.31 | 3.34 |
| f2 | −3.86 | −4.72 | −5.23 |
| f3 | 9.74 | 9.16 | 4.68 |
| f4 | 3.99 | 3.29 | 8.77 |
| f5 | −2.63 | −2.59 | −3.43 |
| F NO | 2.94 | 2.80 | 2.89 |
| Expression (1) | 0.98 | 0.76 | 1.62 |
| Expression (2) | 2.44 | 2.78 | .53 |
| Expression (3) | 0.64 | 0.77 | 0.61 |
| Expression (4) | 2.38 | 2.12 | 0.86 |
| Expression (5) | 0.004 | 0.010 | 0.074 |
| Expression (6) | 0.059 | 0.182 | 0.197 |
| Expression (7) | 25 | 24 | 24 |

Thus, it is possible to use such image pickup optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 15:
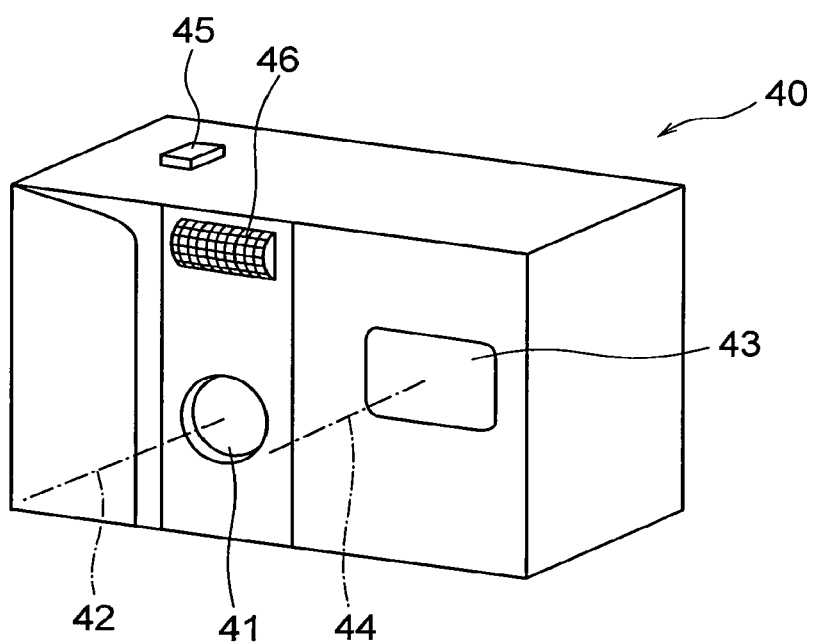
FIG. 15 is a front perspective view showing an appearance of a digital camera 40 in which, the image pickup optical system according to the present invention is incorporated.
Figure 16:
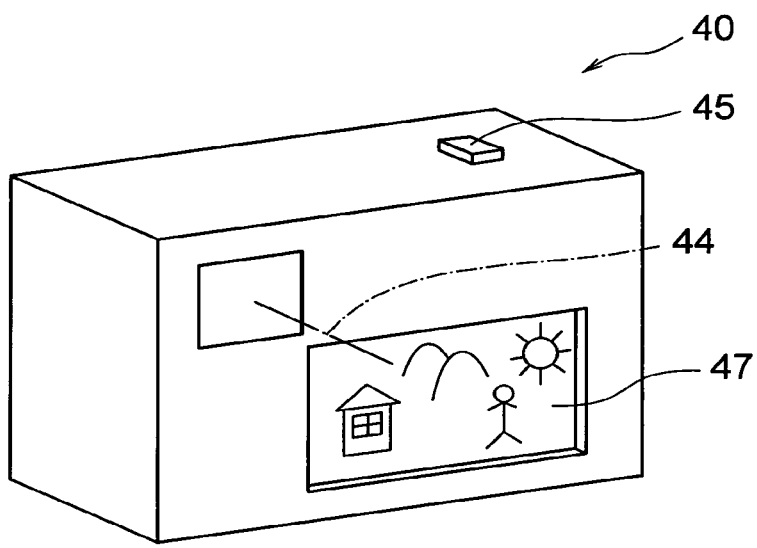
FIG. 16 is a rear perspective view of the digital camera 40.
Figure 17:
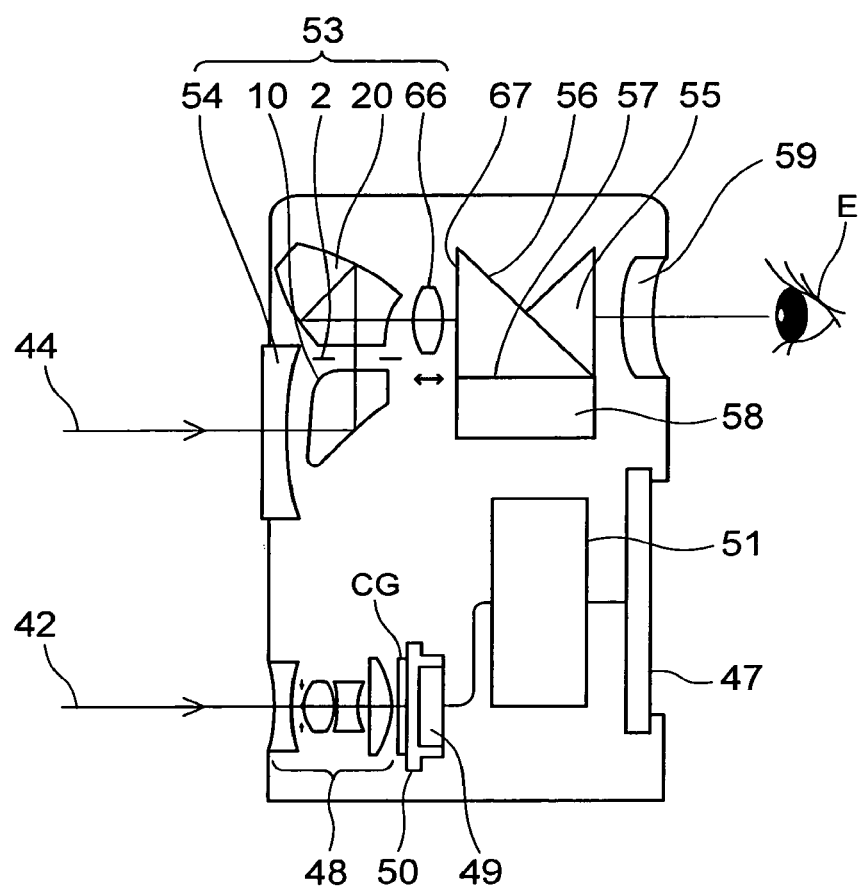
FIG. 17 is a cross-sectional view showing an optical structure of the digital camera 40.

In FIG. 15 to FIG. 17 show conceptual diagrams of structures in which the image pickup optical system according to the present invention is incorporated in a photographic optical system 41 of a digital camera. FIG. 15 is a frontward perspective view showing an appearance of a digital camera 40, FIG. 16 is a rearward perspective view of the same, and FIG. 17 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the image pickup optical system in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having an image pickup optical system with a reduced size and thickness, in which the number of structural components is reduced.

Figure 18:
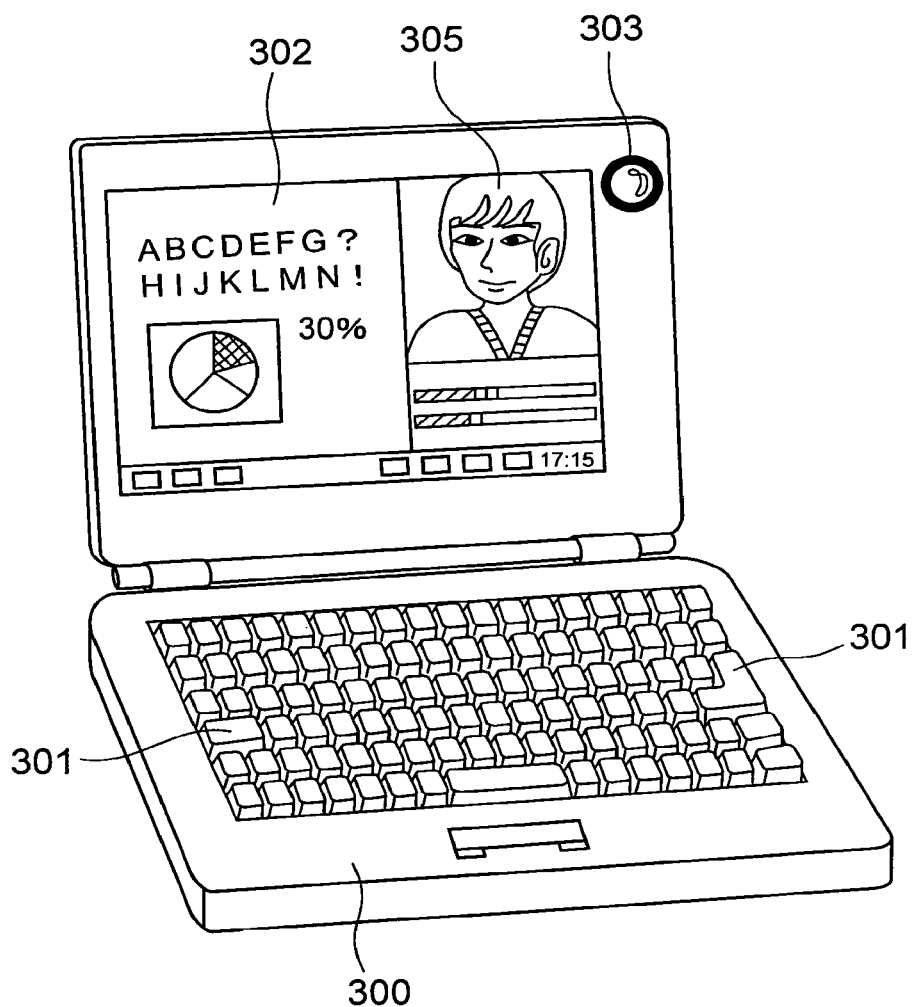
FIG. 18 is a front perspective view of a state in which, a cover of a personal computer 300, which is an example of an information processing apparatus in which, the image pickup optical system of the present invention is built-in as an objective optical system, is opened.
Figure 19:
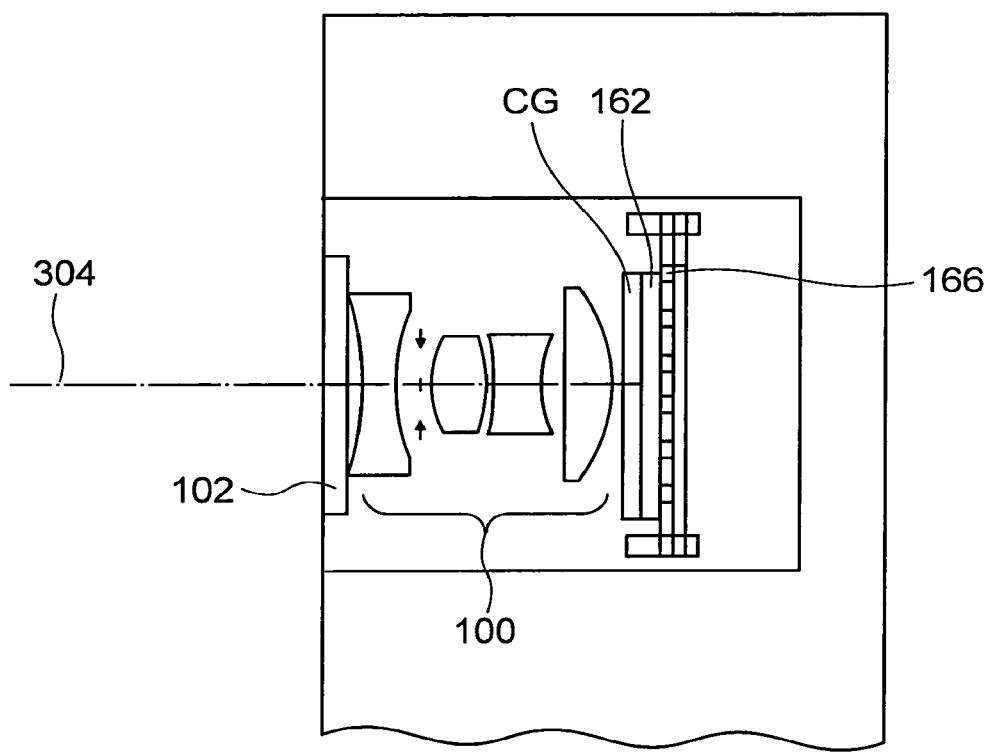
FIG. 19 is a cross-sectional view of a photographic optical system 303 of the personal computer 300.
Figure 20:
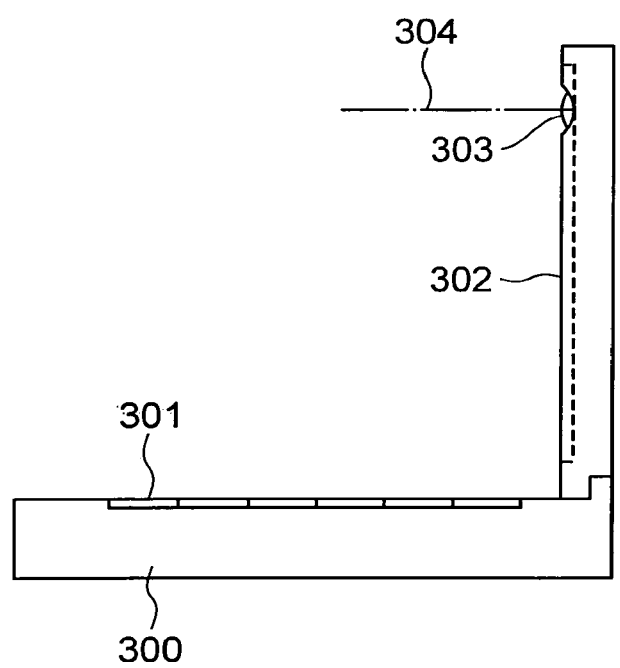
FIG. 20 is a side view of the personal computer 300.

Next, a personal computer which is an example of an information processing apparatus with a built-in image forming system as an objective optical system is shown in FIG. 18 to FIG. 20. FIG. 18 is a frontward perspective view of a personal computer 300 with its cover opened, FIG. 19 is a cross-sectional view of a photographic optical system 303 of the personal computer 300, and FIG. 20 is a side view of FIG. 18. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the image pickup optical system in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 18, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 21A:
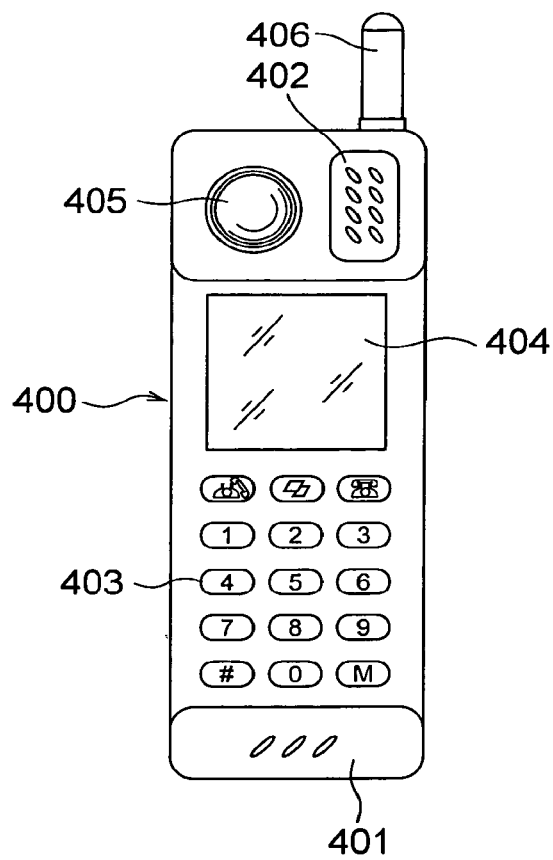
FIG. 21A, FIG. 21B, and FIG. 21C are diagrams showing a cellular phone which is an example of an information processing apparatus in which, the image pickup optical system of the present invention is built-in as a photographic optical system, where.
Figure 21B:
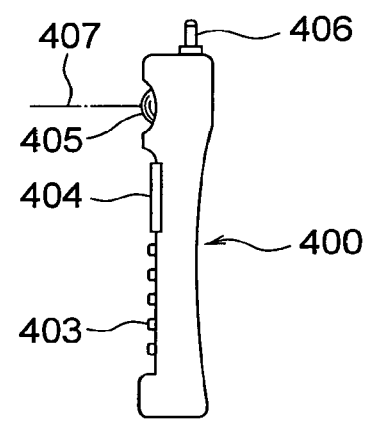
Figure 21C:
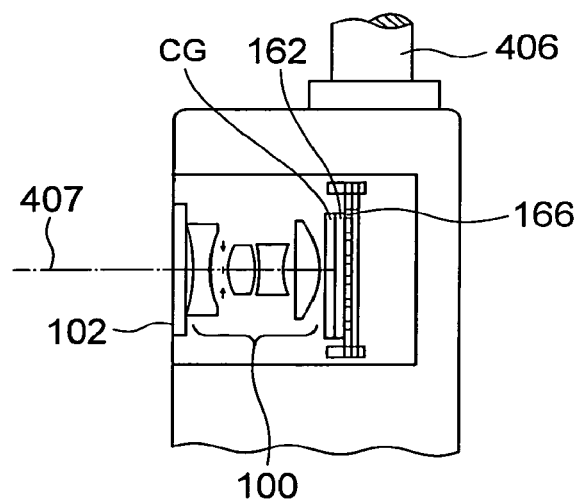

Next, a telephone which is an example of an information processing apparatus in which the image pickup optical system of the present invention is built-in as a photographic optical system, particularly a portable telephone which is easy to carry is shown in FIG. 21A, FIG. 21B, and FIG. 21C. FIG. 21A is a front view of a portable telephone 400, FIG. 21B is a side view of the portable telephone 400, and FIG. 21C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the image pickup optical system in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

An image pickup optical system of this information processing unit, though differs from a lens cross-sectional arrangement in each of the numerical embodiments, the image pickup optical system of each of the embodiments is mounted as described above.

The present invention may have various modified embodiments which fairly fall within the basic teachings herein set forth.

As it has been described above, the present invention is useful for an image pickup optical system having a small size and an improved performance.

According to the present invention, an effect is shown that it is possible to provide an image pickup optical system having a small size and an improved performance, and an image pickup apparatus which includes the image pickup optical system.

What is claimed is:

1. An image pickup optical system, comprising:
a plurality of lenses and an aperture stop;
wherein the plurality of lenses consists of five lenses, the image pickup optical system comprising in order from an object side:
the aperture stop;
a first lens having a positive refracting power;
a second lens having a negative refracting power;
a third lens;
a fourth lens having a positive refracting power; and
a fifth lens having a negative refracting power,
wherein the image pickup optical system has a fixed focal length, and
at least one of surfaces of the fifth lens has an inflection point, and the image pickup optical system satisfies the following conditional expressions $$-1.27 < r8/f < -0.25$$

$$0.36 < f4/f \leqq 0.98$$

where,
f denotes a focal length of the overall image pickup optical system,
f4 denotes a focal length of the fourth lens, and
r8 denotes a paraxial radius of curvature of an object side surface of the fourth lens.

2. The image pickup optical system according to claim 1, wherein the image pickup optical system satisfies the following conditional expression $$0.28 < f1/f < 1.23$$

where,
f denotes a focal length of the overall image pickup optical system, and
f1 denotes a focal length of the first lens.

3. The image pickup optical system according to claim 1, wherein a surface on an image surface side of the second lens is concave shaped toward the image surface side.

4. The image pickup optical system according to claim 1, wherein a surface on an object side of the third lens is concave shaped.

5. The image pickup optical system according to claim 1, wherein the image pickup optical system satisfies the following conditional expression $$vd3 < 30.2$$

where,
vd3 denotes an Abbe's number for the third lens.

6. The image pickup optical system according to claim 1, wherein a surface on an object side of the fifth lens is concave shaped.

7. The image pickup optical system according to claim 1, wherein the image pickup optical system satisfies the following conditional expression $$0 < |(SAG4AS - SAG4AA)/4AR| < 0.147$$

and $$0 < |(SAG4BS - SAG4BA)/4BR| < 0.395$$

where,
SAG4AS denotes a sag amount at a position which is 60% of an effective diameter when a surface on the object side of the fourth lens is let to be a spherical surface,
SAG4AA denotes a sag amount at a position which is 60% of an effective diameter of the surface on the object side of the fourth lens,
SAG4BS denotes a sag amount at a position which is 60% of an effective diameter when a surface on an image pickup surface side of the fourth lens is let to be a spherical surface, SAG4BA denotes a sag amount at a position which is 60% of an effective diameter of the surface on the image pickup surface side of the fourth lens, 4AR denotes a paraxial radius of curvature of the surface on the object side of the fourth lens, and 4BR denotes a paraxial radius of curvature of the surface on the image pickup surface side of the fourth lens.

8. The image pickup optical system according to claim 1, wherein there is an air space between the second lens and the third lens.

9. The image pickup optical system according to claim 1, wherein an air space between the second lens and the third lens works as an air lens having a biconvex shape.

10. The image pickup optical system according to claim 1, wherein the first lens, the second lens, the third lens, the fourth lens, and the fifth lens are formed of a resin.

11. The image pickup optical system according to claim 1, wherein
the image pickup apparatus satisfies the following conditional expression $$15° < \alpha i < 30°$$

where, $\alpha i$ denotes an angle of incidence of principal light rays on an image pickup surface at the maximum image height.

12. An image pickup apparatus comprising:
an image pickup optical system; and
an electronic image pickup element having an image pickup surface which receives an image from the image pickup optical system,
wherein the image pickup optical system comprises in order from an object side:
an aperture stop;
a first lens having a positive refracting power;
a second lens having a negative refracting power;
a third lens;
a fourth lens having a positive refracting power; and
a fifth lens having a negative refracting power,
wherein the image pickup optical system has a fixed focal length, and
at least one of surfaces of the fifth lens has an inflection point, and the image pickup optical system satisfies the following conditional expressions $$-1.27 < r8/f < -0.25$$

$$0.36 < f4/f \leq 0.98$$

where, f denotes a focal length of the overall image pickup optical system, f4 denotes a focal length of the fourth lens, and r8 denotes a paraxial radius of curvature of an object side surface of the fourth les.

13. The image pickup apparatus according to claim 12, further comprising:
a shutter mechanism which is nearest to the object side of the image pickup optical system.

14. The image pickup apparatus according to claim 12, wherein the image pickup optical system includes an autofocus mechanism.

15. The image pickup apparatus according to claim 12, wherein a surface on an object side of the fifth lens is concave shaped.

16. An information terminal comprising:
an input section which operates the information terminal;
a processing section which processes at least information from the input section;
an image pickup apparatus which obtains image information based on the information from the processing section;
an image processing section which processes the image information obtained by the image pickup apparatus;
a display section which displays the processed image,
wherein
the image pickup apparatus comprises:
an image pickup optical system; and
an electronic image pickup element having an image pickup surface which receives an image from the image pickup optical system,
wherein the image pickup optical system comprises in order from an object side:
an aperture stop;
a first lens having a positive refracting power;
a second lens having a negative refracting power;
a third lens;
a fourth lens having a positive refracting power; and
a fifth lens having a negative refracting power,
wherein the image pickup optical system has a fixed focal length, and
at least one of surfaces of the fifth lens has an inflection point, and the image pickup optical system satisfies the following conditional expressions $$-1.27 < r8/f < -0.25$$

$$0.36 < f4/f \leq 0.98$$

where, f denotes a focal length of the overall image pickup optical system, f4 denotes a focal length of the fourth lens, and r8 denotes a paraxial radius of curvature of an object side surface of the fourth lens.

17. The information terminal according to claim 16, further comprising:
a communication section which is able to communicate the image information obtained by the image pickup apparatus.

18. The information terminal according to claim 16, further comprising:
a microphone section; and
an information recording section.

19. The information terminal according to claim 16, wherein a surface on an object side of the fifth lens is concave shaped.

20. The information terminal according to claim 16, wherein the information terminal is a portable electronic device.

* * * * *